US009118201B2

(12) United States Patent
Kumar

(10) Patent No.: US 9,118,201 B2
(45) Date of Patent: Aug. 25, 2015

(54) SYSTEMS AND METHODS FOR ENERGY TRANSFER CONTROL

(71) Applicant: General Electric Company, Schenectady, NY (US)

(72) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 229 days.

(21) Appl. No.: 13/708,943

(22) Filed: Dec. 8, 2012

(65) Prior Publication Data

US 2013/0304342 A1    Nov. 14, 2013

Related U.S. Application Data

(60) Provisional application No. 61/644,102, filed on May 8, 2012.

(51) Int. Cl.
| | |
|---|---|
| *B60T 8/1755* | (2006.01) |
| *B60T 8/172* | (2006.01) |
| *H02J 7/00* | (2006.01) |
| *B60L 11/00* | (2006.01) |

(52) U.S. Cl.
CPC ............. *H02J 7/007* (2013.01); *B60L 11/00* (2013.01); *B60L 2200/26* (2013.01); *Y02T 90/16* (2013.01)

(58) Field of Classification Search
CPC .................................... B66B 1/30; H02P 3/14
USPC ........ 701/70; 318/375, 376; 187/290; 361/18
See application file for complete search history.

(56) References Cited

U.S. PATENT DOCUMENTS

| | | | |
|---|---|---|---|
| 5,070,959 A | 12/1991 | Grabowski | |
| 5,170,105 A | 12/1992 | Kumar | |
| 5,245,294 A | 9/1993 | Kumar | |
| 5,283,507 A | 2/1994 | Stitt et al. | |
| 5,331,261 A | 7/1994 | Brown et al. | |
| 5,345,358 A | 9/1994 | Kumar | |
| 6,304,006 B1 * | 10/2001 | Jungreis | .......................... 307/64 |
| 6,583,705 B2 | 6/2003 | Schutten et al. | |
| 6,586,914 B2 | 7/2003 | Garrigan et al. | |
| 6,591,758 B2 | 7/2003 | Kumar | |
| 6,612,245 B2 | 9/2003 | Kumar et al. | |
| 6,612,246 B2 | 9/2003 | Kumar | |
| 6,615,118 B2 | 9/2003 | Kumar | |
| 6,803,734 B2 | 10/2004 | Kumar et al. | |

(Continued)

FOREIGN PATENT DOCUMENTS

EP    2500309 A1 *  9/2012  ............. B66B 1/30

*Primary Examiner* — Helal A Algahaim
*Assistant Examiner* — Michael Fouche
(74) *Attorney, Agent, or Firm* — GE Global Patent Operation; John A. Kramer

(57) ABSTRACT

A control system includes a first switching module and a second switching module. The second switching module is operably connected to the first switching module. The control system is configured to be selectably connected to at least two of an energy dissipation system, an external energy storage system, or an internal energy storage system. When the control system is selected for electrical communication with one of the at least two of an energy dissipation system, external energy charging system, or internal energy storage system, the first and second switching modules control the path of a current distributed through the one of the at least two of an energy dissipation system, external energy charging system, or internal energy storage system.

19 Claims, 6 Drawing Sheets

(56) References Cited

U.S. PATENT DOCUMENTS

| | | |
|---|---|---|
| 6,859,018 B2 | 2/2005 | Garrigan et al. |
| 6,870,350 B2 | 3/2005 | Garrigan et al. |
| 6,973,880 B2 | 12/2005 | Kumar |
| 7,034,480 B2 | 4/2006 | Kumar et al. |
| 7,035,065 B2 | 4/2006 | McNally et al. |
| 7,078,877 B2 | 7/2006 | Salasoo et al. |
| 7,137,344 B2 | 11/2006 | Kumar et al. |
| 7,185,591 B2 | 3/2007 | Kumar et al. |
| 7,231,877 B2 | 6/2007 | Kumar |
| 7,256,974 B2 | 8/2007 | McNally et al. |
| 7,325,498 B2 | 2/2008 | Kumar et al. |
| 7,430,967 B2 | 10/2008 | Kumar |
| 7,444,944 B2 | 11/2008 | Kumar et al. |
| 7,448,328 B2 | 11/2008 | Kumar |
| 7,505,236 B2 | 3/2009 | Kobielski |
| 7,532,960 B2 | 5/2009 | Kumar |
| 7,557,528 B2 | 7/2009 | Kumar et al. |
| 7,571,683 B2 | 8/2009 | Kumar et al. |
| 7,614,469 B2 | 11/2009 | Kumar et al. |
| 7,669,534 B2 | 3/2010 | Kumar et al. |
| 7,721,855 B2 | 5/2010 | Marsh et al. |
| 7,770,525 B2 | 8/2010 | Kumar et al. |
| 7,854,203 B2 | 12/2010 | Kumar |
| 7,882,789 B2 | 2/2011 | Kumar et al. |
| 7,921,946 B2 | 4/2011 | Kumar |
| 7,928,597 B2 | 4/2011 | Gupta et al. |
| 8,006,626 B2 | 8/2011 | Kumar et al. |
| 8,063,609 B2 | 11/2011 | Salasoo et al. |
| 8,136,643 B2 | 3/2012 | Marsh et al. |
| 8,188,692 B2 | 5/2012 | Kumar |
| 8,212,532 B2 | 7/2012 | Kumar |
| 8,299,756 B2 | 10/2012 | Chawla |
| 2005/0024002 A1* | 2/2005 | Jackson .................. 318/375 |
| 2006/0005736 A1 | 1/2006 | Kumar |
| 2006/0005738 A1 | 1/2006 | Kumar |
| 2006/0005739 A1 | 1/2006 | Kumar |
| 2006/0012320 A1* | 1/2006 | Kumar .................... 318/376 |
| 2006/0221516 A1* | 10/2006 | Daboussi ................. 361/18 |
| 2006/0232240 A1 | 10/2006 | Salasoo et al. |
| 2007/0142985 A1 | 6/2007 | Kumar |
| 2008/0280198 A1 | 11/2008 | Kumar et al. |
| 2008/0315698 A1 | 12/2008 | El-Refaie et al. |
| 2009/0115371 A1 | 5/2009 | Chawla et al. |
| 2010/0186619 A1 | 7/2010 | Kumar |
| 2011/0041723 A1 | 2/2011 | Kumar |
| 2011/0106401 A1 | 5/2011 | Kumar et al. |
| 2011/0308765 A1 | 12/2011 | Kumar et al. |
| 2012/0112693 A1 | 5/2012 | Kusch et al. |
| 2012/0129022 A1 | 5/2012 | Kalish et al. |
| 2012/0248929 A1 | 10/2012 | Fish |
| 2014/0008155 A1* | 1/2014 | Rossignol ................ 187/290 |

\* cited by examiner

SYSTEMS AND METHODS FOR ENERGY TRANSFER CONTROL

This application claims priority to U.S. provisional application Ser. No. 61/644,102, filed May 8, 2012, hereby incorporated by reference herein.

TECHNICAL FIELD

Embodiments of the presently described inventive subject matter relate to energy transfer control systems.

BACKGROUND

Control systems associated with vehicle systems, such as a rail vehicle system including one or more powered units (such as locomotives) and one or more non-powered units, may be used to control an amount or direction of energy transfer between various portions of the vehicle system. The powered units may require energy, for example, to power traction motors to propel the vehicle system. The non-powered units may also require power. Such power may be provided, for example, from a powered unit to one or more non-powered units in a head end power ("HEP") arrangement. For example, if the non-powered units are used as passenger cars, than power may be required for heating or cooling a passenger car, providing lighting for the passenger car, or outlet power for other passenger necessities or conveniences. Similarly, if the non-powered units are used as cargo cars, such cars may also require power for lighting, refrigeration, or other uses.

The powered units of such a vehicle system may utilize a direct current source, such as a battery that is charged or powered by a prime mover, such as a diesel engine, or a battery that is additionally or alternatively charged by an external energy source. Other power sources may also be used additionally or alternatively. For example, in addition to a battery, the vehicle system may utilize a capacitor for energy storage. Also, energy may be provided by dynamic braking, which also may be used to charge the battery. Further, external charging systems may be used, such as a third rail, catenary, or AC source to which the vehicle system may be connected when at rest, such as a bayside charging station. Further, energy may be transferred between the various power sources. For example, energy may be transferred from a capacitor to a battery.

Vehicle systems, such as rail vehicle systems, may require a considerably large amount of power to perform a given mission. For example, a commuter rail vehicle system that utilizes power supplied from an external source to charge an onboard battery may be required to make a number of trips between multiple destinations before the battery can be recharged. A considerable amount of energy thus may be required to be stored in the battery, resulting in a generally large space being required not just for the battery, but also, for example, for hardware associated with the control and function of the battery. However, space is frequently at a premium on such vehicle systems.

Further still, vehicle systems may also include a number of different energy management systems, each consuming a generally large space on-board the vehicle system. The hardware associated with the control and function of each of the various systems results in an even larger amount of weight onboard the vehicle system, and increases the space consumed on the vehicle system, and increases the expense to procure, operate and maintain the vehicle system.

BRIEF DESCRIPTION

In one embodiment, a control system includes a first switching module and a second switching module. The second switching module is operably connected to the first switching module. The control system is configured to be selectably connected to at least two of an energy dissipation system, an external energy storage system, or an internal energy storage system. The energy dissipation system is configured to dissipate energy associated with a vehicle system. The external energy charging system is configured to provide energy from a source external to the vehicle system for storage by the internal energy storage system. The internal energy storage system is configured to store energy for use by the vehicle system. When the control system is selected for electrical communication with one of the at least two of an energy dissipation system, external energy charging system, or internal energy storage system, the first and second switching modules control the path of a current distributed through the one of the at least two of an energy dissipation system, external energy charging system, or internal energy storage system.

As used herein, the terms "module" and "system" include a hardware and/or software system that operates to perform one or more functions. For example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. The modules shown in the attached figures may represent the hardware that operates based on software or hardwired instructions, the software that directs hardware to perform the operations, or a combination thereof.

In another embodiment, a first switching control system includes a first switching module and a second switching module. The second switching module is operably connected to the first switching module. The system also includes a first energy dissipation system configured to dissipate energy associated with a vehicle system. The first switching control system is selectably connected to the first energy dissipation system. The first energy dissipation system includes a resistive load configured to dissipate energy from a dynamic braking activity. Also, the system includes a second switching control system that includes a third switching module and a fourth switching module, with the fourth switching module operably connected to the third switching module. The second switching control system is selectably connected to at least one of the first energy dissipation system or a second additional energy dissipation system. Further, the first switching control system and the second switching control system are configured to be selectably connected to at least one of an external energy charging system or an internal energy storage system. When one of the first and second switching control systems is selected for electrical communication with one of the first energy dissipation system or the second energy dissipation system, the other of the first and second switching control systems is configured to be contemporaneously selectable for electrical communication with one of the at least one of an external energy charging system or internal energy storage system and to control the path of a current distributed through the one of the at least one of an external energy charging system or internal energy storage system when selected for electrical communication with one of the at least one of an external energy charging system or internal energy storage system.

In another embodiment, a method (e.g. a method for controlling energy transfer in a vehicle system) includes controlling a path of current through a dynamic braking energy dissipation module of a vehicle system using a switching system that is selectably connected to the dynamic braking energy dissipation module and at least one of an external charging system or an internal energy storage system. The method also includes disengaging electrical communication between the switching system and the dynamic braking energy dissipation module. Further, the method includes establishing electrical communication between the switching system and one of the at least one of the external charging system or internal energy storage system. Also, the method includes controlling a path of current through the one of the at least one of the external charging system or internal energy storage system using the switching system.

In another embodiment, a vehicle system includes an energy dissipation system, an internal energy storage system, an external energy charging system, and a control system. The energy dissipation system is disposed onboard a vehicle and configured to dissipate energy of a dynamic braking operation of the vehicle. The internal energy storage system is disposed onboard the vehicle and configured to store energy for use by the vehicle. The external energy charging system is disposed onboard the vehicle and configured to provide energy from a source external to the vehicle for storage by the internal energy storage system. The control system includes a first switching module onboard the vehicle and a second switching module onboard the vehicle that is operably connected with the first switching module. The control system is configured to be selectably connected to the energy dissipation system, the internal energy storage system, and the external energy charging system. When the control system is selected for electrical communication with one of the energy dissipation system, the external energy charging system, or the internal energy storage system, the first and second switching modules are operative to control the path of a current distributed through the one of the energy dissipation system, the external energy charging system, or the internal energy storage system.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide systems for controlling current flow through a plurality of systems/subsystems using a switching control system selectably connected to the members of the plurality of subsystems. (The systems/subsystems may be energy management modules, for example.) In certain embodiments, for example, the flow of current through a first subsystem of a vehicle system may be controlled by the switching control system by selecting the switching control system for electrical communication with the first subsystem. Then the switching control system may be de-selected for electrical communication with the first subsystem and selected for electrical communication with a second subsystem so that the switching control system may be used to control flow of current in the second subsystem. Systems according to embodiments may be hardwired to the members of the plurality of subsystems. Systems according to embodiments may be located on-board, for example, a rail vehicle system. Providing selectable connection between a shared switching control system to a plurality of subsystems may require fewer switching control systems, less hardware and resulting footprint and weight, less cost, and/or less maintenance. Embodiments provide for interfacing of additional or external energy storage systems with existing vehicle systems or subsytems.

As used herein, selectably connected describes devices or systems that are operably linked to each other, but are not necessarily continuously functionally linked or in generally continuous electrical communication. By closing a path between the selectably connected devices or systems, the selectably connected devices or systems are placed in electrical communication or functionally linked. By opening a path between the selectably connected devices, the selectably connected devices are disengaged, or removed from electrical communication, or no longer functionally linked. Thus, a switching system that is selectably connected to a plurality of energy management systems may be readily and conveniently switched between a functional connection with a given one of the energy management subsystems to a functional connection to another.

Embodiments provide for a reduced footprint required for hardware associated with switching control systems for energy management modules. Embodiments provide for reduced cost of procuring, maintaining, and operating, for example, energy management control system of rail vehicles.

Figure 1:
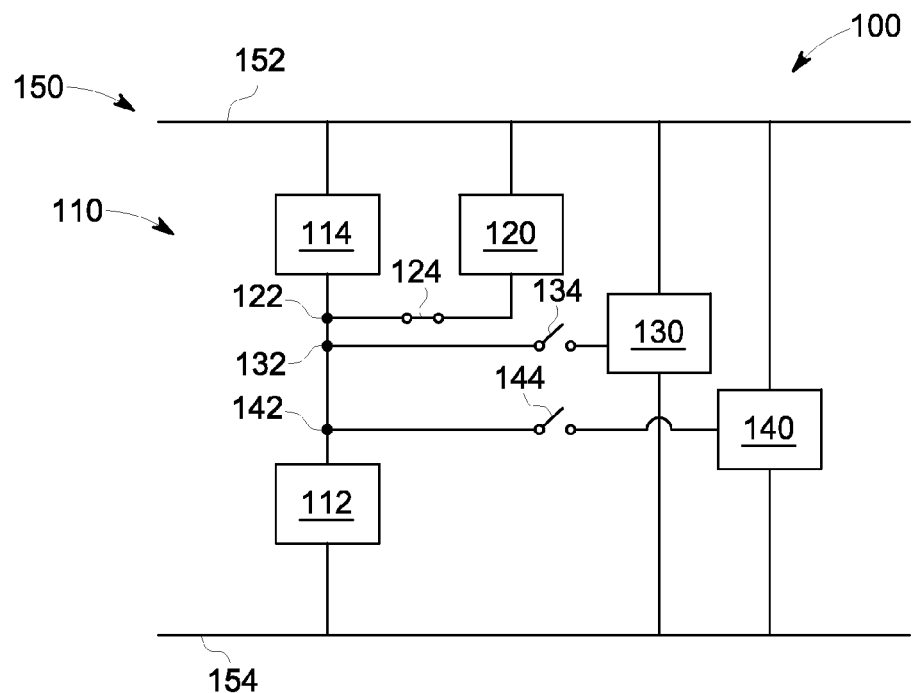
FIG. 1 is a block diagram of one embodiment of a system including a switching control system selectably connected to a plurality of energy management modules.

FIG. 1 illustrates a schematic view of a system 100 comprising a switching control system 110, an energy dissipation module 120, an internal energy storage module 130, and an external charging module 140. The switching control system 110, energy dissipation module 120, internal energy storage module 130, and external charging module 140 are operably connected to a direct current (DC) bus 150 between a positive portion 152 and a negative portion 154. The switching control system 110, energy dissipation module 120, internal energy storage module 130, and external charging module 140 are examples of energy management modules.

The system 100 may be associated with or located within a rail vehicle system, for example, with the DC bus 150 connected to traction drives, auxiliary drives, and a power source, such as one or more of a battery or generator. The system 100 may, for example, be used with vehicle systems, such as rail vehicle systems that obtain power from an external source, such as a charging station to which the vehicle system may be removably plugged into, a catenary, or a third rail. Other applications and/or uses are possible, including, for example, vehicle systems that may not obtain power from an external source or vehicle systems that obtain power from an onboard source as well as from external sources, other types of vehicles systems or, as another example, other systems where power is provided from a powered source to a non-powered receiving device or system. For example, one or more embodiments described herein may be used with non-rail vehicle systems, such as marine vessels, other off-highway vehicles, and the like.

The switching control system 110 includes a first switching module 112 and a second switching module 114. The switching modules may comprise, for example, insulated gate bipolar transistors (IGBTs). The switching modules are configured for different settings. For example, the switching modules may be movable or otherwise controllable between an off position or other off state (where current does not flow through) and an on position or other on state (where current does flow through, or where current flows through in a selected direction). As another example, the switching modules may include a diode setting allowing current to flow in only one direction. Thus, by moving or otherwise controlling the switching modules between on and off positions (or other on and off states, respectively), current can be routed accordingly along different paths determined by which switching module is open or closed (off or on). Further, by controlling an amount of time that a switching module is on, the duration during which current may flow over a given path may be controlled. The first switching module 112 and the second switching module 114, as depicted in FIG. 1, are operably connected and in electrical communication with each other.

The energy dissipation module 120 is configured to dissipate energy from a source. For example, the energy dissipation module 120 may be associated with a propulsion system including dynamic braking capability. The propulsion system, for example, includes traction drives associated with a traction motor. The vehicle system is propelled by using the drives to drive the traction motor. When the vehicle system is slowed using dynamic braking, energy is removed from a traction system to help slow the vehicle system. In hybrid applications, for example, this energy available from dynamic braking may then be used to store energy to power the vehicle system, for example by charging a battery. However, the battery or other power storage system may not have sufficient capacity to accept all of the electrical energy provided by the dynamic braking activity. Thus, the energy dissipation module 120 may be used to dissipate the energy from dynamic braking, or the excess energy from dynamic braking unable to be utilized by a different portion of the vehicle system. The energy dissipation module may include for example, one or more resistive elements that form a resistive load that can dissipate electrical energy when current flows through the resistive elements, along with a blower or other device to help dissipate heat energy created by the resistive load.

For the embodiment illustrated in FIG. 1, the energy dissipation module 120 is operably connected to one portion of the DC bus 150, as well as to the switching control system 110. In the depicted embodiment, the energy dissipation module 120 is operably connected to the switching control system 110 at a point 122 interposed between the first switching module 112 and the second switching module 114. Further, the energy dissipation module 120 is selectably connected to the switching control system 110. In the illustrated embodiment, the system 100 includes a dissipation contact 124. When the dissipation contact 124 is open, current is inhibited from flowing between the energy dissipation module 120 and the point 122 joining the energy dissipation module 120 to the switching control system 110, so that the energy dissipation module 120 and the switching control system 110 are not in electrical communication with each other.

When the dissipation contact 124 is closed as depicted in FIG. 1, current is allowed to flow between the energy dissipation module 120 and the point 122 joining the energy dissipation module 120 to the switching control system 110, so that the energy dissipation module 120 and the switching control system 110 are in electrical communication with each other. With the energy dissipation module 120 and the switching control system in electrical communication with each other, one or more paths for current are defined by the setting of the switching modules, for example which of the switching modules is in an on position or other on state and which is in an off position or other off state. In embodiments, the system 100 includes a plurality of similar or different types of energy dissipation modules, each with an associated switching control system.

The internal energy storage module 130 is configured to store energy for use by the vehicle system. For example, the internal energy storage module 130 may include one or more of a battery or energy storage capacitor. Such a battery (or capacitor) may in turn include a group of smaller batteries (or capacitors) used to form a combined battery unit (or capacitor unit). For example, a battery may include battery banks which are formed by groups of individual cells. The internal energy storage system may be charged by an external source or, as another example, from electrical energy received from traction drives during a dynamic braking activity. Similarly, different portions of the internal energy storage system may be used to charge other portions of the internal energy storage system. For example, one bank of a battery may be used to charge another bank of a battery during a battery balancing activity. Further, different internal energy storage modules may be used to provide energy to each other. For example, a battery and energy storage capacitor may transfer energy therebetween.

For the embodiment illustrated in FIG. 1, the internal energy storage module 130 is operably connected to each end of the DC bus 150, as well as to the switching control system 110. With the internal energy storage module 130 operably connected to each end of the DC bus, the internal energy storage module 130 may transfer energy with one or more other modules or systems also connected to each end of the DC bus. For example, the internal energy storage module 130 may receive energy from a dynamic braking activity, or may provide energy to, for example, a traction drive for propelling the vehicle system, or as another example, to an auxiliary drive for performing an auxiliary function of the vehicle system.

In the depicted embodiment, the internal energy storage module 130 is operably connected to the switching control system 110 at a point 132 interposed between the first switching module 112 and the second switching module 114. Further, the internal energy storage module 130 is selectably connected to the switching control system 110. In the illustrated embodiment, the system 100 includes an internal energy contact 134. When the internal energy contact 134 is open as depicted in FIG. 1, current is inhibited from flowing between the internal energy storage module 130 and the point 132 joining the internal energy storage module 130 to the switching control system 110, so that the internal energy storage module 130 and the switching control system 110 are not in electrical communication with each other. When the internal energy contact 134 is closed, current is allowed to flow between the internal energy storage module 130 and the point 132 joining the internal energy storage module 130 to the switching control system 110, so that the internal energy storage module 130 and the switching control system 110 are in electrical communication with each other. Energy transfer to or from a system associated with the switching control system 110 may be controlled by defining paths along which current flows and the timing or duration for which a given path or paths is used.

With the internal energy storage module 130 and the switching control system 110 in electrical communication with each other, one or more paths for current to flow along may be defined by settings of the switching modules, for example which of the switching modules is in an on position or other on state and which is in an off position or other off state. Further, the system 100 may comprise a plurality of similar or different types of internal energy storage modules, with the switching control system 110 operably and selectably connected to one or more of the plurality of internal energy storage modules. For example, the system may include a first internal energy storage module that comprises a battery and a second internal energy storage module, with a switching system operably and selectably connected to both the first and second internal energy storage modules (as well as, for example, one or more energy dissipation modules or external charging modules).

The external charging module 140 is configured to transfer energy between a system disposed within the vehicle system and an external source to which the vehicle system is coupled, removably or otherwise. For example, the external charging module 140 may be used to provide energy to a portion of the vehicle system from a source external to the vehicle system. The vehicle system may then store the energy for later use. As an example, the vehicle system may receive energy from a charging station to which the vehicle system may be removably plugged into, either at designated times, or as the need for more energy arises. For example, certain rail vehicle systems, which may be used for transporting commuters, may operate on electrical energy stored within a battery. The battery may be recharged during stops overnight, as well as at stops during a mid-day period where less activity is required on the commuter rail line. As another example, energy may be received from a catenary, or, as yet another example, a third rail. Further, energy may be transferred from the vehicle system to an external system. For example, energy from within the vehicle system may be transferred to a third rail.

For the embodiment illustrated in FIG. 1, the external charging module 140 is operably connected to each end of the DC bus 150, as well as to the switching control system 110. With the external charging module 140 operably connected to each end of the DC bus, the external charging module 140 may facilitate the transfer energy between an external charging source with one or more other modules or systems also connected to each end of the DC bus. For example, the external charging module 140 may receive energy from an external source and provide energy to, for example, an internal energy storage module such as a battery.

In the depicted embodiment, the external charging module 140 is operably connected to the switching control system 110 at a point 142 interposed between the first switching module 112 and the second switching module 114. Further, the external charging module 140 is selectably connected to the switching control system 110. In the illustrated embodiment, the system 100 includes an external energy contact 144. When the external energy contact 144 is open as depicted in FIG. 1, current is inhibited from flowing between the external charging module 140 and the point 142 joining the external charging module 140 to the switching control system 110, so that the external charging module 140 and the switching control system 110 are not in electrical communication with each other. When the external energy contact 144 is closed, current is allowed to flow between the external charging module 140 and the point 142 joining the external charging module 140 to the switching control system 110, so that the external charging module 140 and the switching control system 110 are in electrical communication with each other. Again, energy transfer to or from a system associated with the switching control system 110, such as the external charging module 140, may be controlled by defining paths along which current flows and the timing or duration for which a given path or paths is used.

With the external charging module 140 and the switching control system 110 in electrical communication with each other, one or more paths for current to flow along may be defined by settings of the switching modules, for example which of the switching modules is in an on position (or other on state) and which is in an off position (or other off state). Further, the system 100 may comprise a plurality of similar or different types of external energy storage modules, with the switching control system 110 operably and selectably connected to one or more of the plurality of internal energy storage modules. For example, the system may include a first external energy charging module that facilitates energy transfer with a charging station via a removable connection, as well as a second external energy charging module that facilitates energy transfer with a third rail, with a switching system operably and selectably connected to both the first and second external energy charging modules (as well as, for example, one or more energy dissipation modules or external charging modules).

As indicated above, the switching control system 110 is thus selectably connected with a plurality of modules, such as one or more energy distribution modules, one or more internal energy storage modules, or one or more external energy charging systems. The switching control system 110 is selectably connected to the plurality of modules through which it is configured to control a flow of current, so that the switching control system may be used to control a current path associated with one module, and subsequently be de-selected from that particular module and selected for use with a different module, through which the switching control system 110 then may be used to control flow of a current. For example, the switching control system 110 may be selected for a module by closing a contact associated with that module to establish electrical communication between the switching control system 110 and the module selected. The switching system may be de-selected from a given module (or modules) by opening a contact (or contacts) associated with the given module (or modules). For example, the selecting and de-selecting may be carried out by a central controller of the vehicle system, a controller dedicated the switching system or energy management systems, or a combination thereof.

Figure 2:
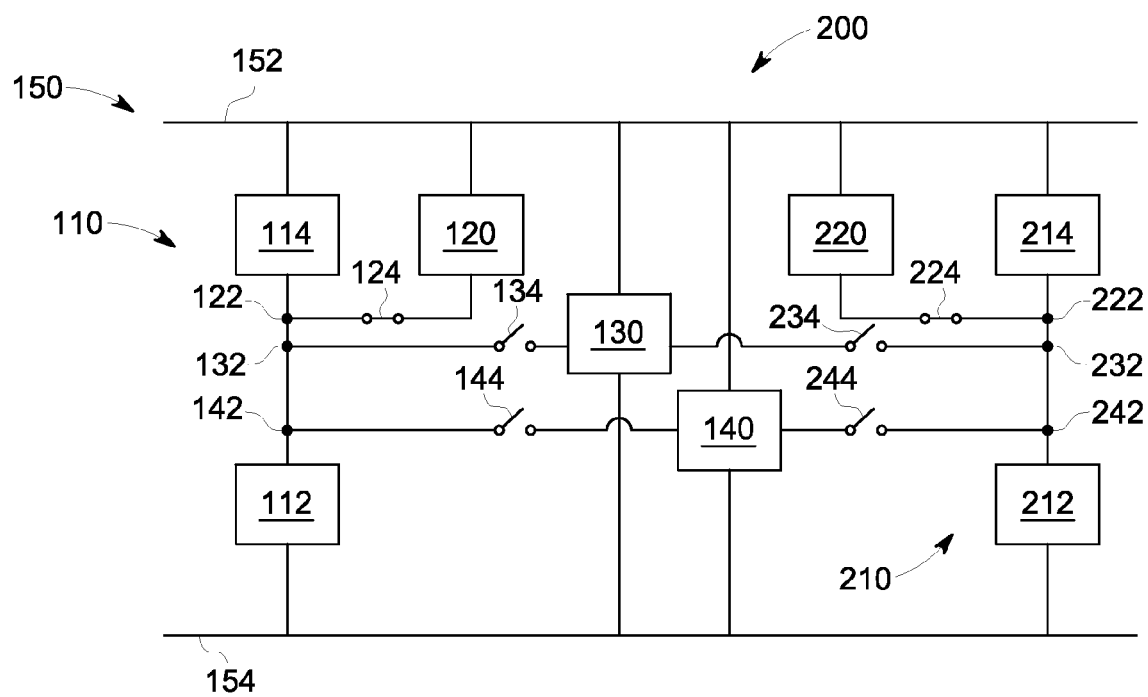
FIG. 2 is a block diagram of another embodiment of a system including a switching control system selectably connected to a plurality of energy management modules.

Further, in certain embodiments, a plurality of switching systems may be selectably connected with a plurality of modules, with each of the switching systems selectably connected with some or all of the plurality of modules. In other embodiments, certain switching control systems may be associated with certain groups of modules. FIG. 2 illustrates a schematic view of a system 200 including a plurality of switching control systems selectably connected to a plurality of modules.

The system 200 is similar in certain general respects to the system 100. For example, the system 200 includes certain components discussed above, with like numbers from FIG. 1 illustrating the same or generally similar element in FIG. 2. The system 200 additionally includes an additional switching control system 210 and an additional energy dissipation module 220.

In the embodiment depicted in FIG. 2, the switching control systems 110, 210 are each selectably connected to only one of the energy dissipation modules 120, 130 respectively. The energy dissipation modules and switching control systems may be seen as dedicated with respect to each other. On the other hand, the switching control systems 110, 210 are both selectably connected to each of the internal energy storage module and the external energy charging module. Thus, the internal energy storage modules and the external energy charging modules may be seen as shared by the switching control systems, and vice versa. The system 200 is intended to be illustrative and not exhaustive of combinations of dedicated and shared modules. In different embodiments, different combinations of different types of modules may be shared or dedicated. Further, more or different types of modules may be employed in other systems, along with additional switching control systems.

The additional switching control system 210 includes a first additional switching module 212 and a second additional switching module 214. The switching modules may be generally similar to the first switching module 112 and the second switching module 14 discussed above. The first additional switching module 212 and the second additional switching module 214, as depicted in FIG. 2, are operably connected and in electrical communication with each other.

The additional energy dissipation module 220 is generally similar to the energy dissipation module 120 in many respects. For example, the additional energy dissipation module 220 may be associated with a propulsion system including dynamic braking capability. The additional energy dissipation module 220 may comprise for example, one or more resistive elements that form a resistive load that can dissipate electrical energy when current flows through the resistive elements, along with a blower or other device to help dissipate heat energy created by the resistive load.

As discussed above in connection with FIG. 1, the internal energy storage module 130 is operably connected to each end of the DC bus 150, as well as to the switching control system 110. Further, the depicted embodiment of FIG. 2, the internal energy storage module 130 is operably connected to the additional switching control system 210 at a point 232 interposed between the first additional switching module 212 and the second additional switching module 214. Further, the internal energy storage module 130 is selectably connected to the additional switching control system 210 via an additional internal energy contact 234. When the additional internal energy contact 234 is open, current is inhibited from flowing between the internal energy storage module 130 and the point 232, so that the internal energy storage module 130 and the additional switching control system 210 are not in electrical communication with each other. When the additional internal energy contact 234 is closed, current is allowed to flow between the internal energy storage module 130 and the point 232 joining the internal energy storage module 130 to the additional switching control system 210, so that the internal energy storage module 130 and the additional switching control system 210 are in electrical communication with each other.

With the internal energy storage module 130 and the additional switching control system 210 in electrical communication with each other, one or more paths for current to flow along may be defined by the settings of the switching modules 212, 214, for example which of the switching modules is in an on position or other on state and which is in an off position or other off state. Again, the system 200 may comprise a plurality of similar or different types of internal energy storage modules, with the additional switching control system 210 operably and selectably connected to one or more of the plurality of internal energy storage modules.

For the embodiment illustrated in FIG. 2, the external charging module 140 is operably connected to each end of the DC bus 150, as well as to the switching control system 110. Further, the external charging module 140 is operably connected to the additional switching control system 210 at a point 242 interposed between the first additional switching module 212 and the second additional switching module 214. Also, the external charging module 140 is selectably connected to the additional switching control system 210 via an additional external energy contact 244. When the additional external energy contact 244 is open, current is inhibited from flowing between the external charging module 140 and the point 242 joining the external charging module 140 to the additional switching control system 210, so that the external charging module 140 and the additional switching control system 210 are not in electrical communication with each other. When the additional external energy contact 244 is closed, current is allowed to flow between the external charging module 140 and the point 242, so that the external charging module 140 and the additional switching control system 210 are in electrical communication with each other.

With the external charging module 140 and the additional switching control system 210 in electrical communication with each other, one or more paths for current to flow along may be defined by the settings of the switching modules of the switching control system 210, such as which of the switching modules is in an on position or other on state and which is in an off position or other off state. Again, the system 200 may comprise a plurality of similar or different types of external energy storage modules, with the additional switching control system 210 operably and selectably connected to one or more of the plurality of internal energy storage modules.

For the embodiment illustrated in FIG. 2, the additional energy dissipation module 220 is operably connected to one end of the DC bus 150, as well as to the additional switching control system 210. In the depicted embodiment, the additional energy dissipation module 220 is operably connected to the additional switching control system 210 at a point 222 interposed between the first additional switching module 212 and the second additional switching module 214. The additional energy dissipation module 220 is selectably connected to the additional switching control system 210 via an additional dissipation contact 224. When the additional dissipation contact 224 is open, current is inhibited from flowing between the additional energy dissipation module 220 and the point 222, so that the additional energy dissipation module 220 and the additional switching control system 210 are not in electrical communication with each other.

When the additional dissipation contact 224 is closed, current is allowed to flow between the additional energy dissipation module 220 and the point 222, so that the additional energy dissipation module 220 and the additional switching control system 210 are in electrical communication with each other. With the additional energy dissipation module 220 and the additional switching control system 210 in electrical communication with each other, one or more paths for current to flow along may be defined by the settings of the switching modules, for example, which of the switching modules is in an on position or other on state and which is in an off position or other off state.

In FIG. 2, the dissipation contact 124 and the additional dissipation contact 224 are shown closed, so that each of the switching control systems is in electrical communication with its dedicated energy dissipation module. By using two switching systems in electrical communication with dedicated energy dissipation modules, more energy may be dissipated if required. Other combinations of modules and switching control systems may be selected for electrical communication.

For example, switching control system 110 may be in electrical contact with energy dissipation module 120 as shown, but the additional switching control system 210 may be dis-connected from electrical communication with the additional energy dissipation module 220 by opening the additional dissipation contact 224, and the additional switching control system 210 may be brought into electrical communication with the internal energy module 130 by closing the additional internal energy contact 234. Thus, while the energy dissipation module 120 is controlled by the first switching control system 110 to dissipate energy (for example, from a dynamic braking activity), the second switching control system 210 may be used to control an internal energy module, for example, to perform a battery balancing activity, or, as another example, to transfer energy from an energy storage capacitor to a battery. Thus, embodiments, for example, allow for increased dynamic braking dissipation, and, alternatively or additionally, allow for multiple modules or systems to be controlled contemporaneously.

The depicted system 200 is intended to be illustrative. Other numbers or types of switching control systems and energy management systems may be employed in other embodiments. In embodiments, certain switching control systems may be dedicated to a single energy management system, other switching control systems may be selectably connected to all of the energy management systems, and still other switching control systems only selectably connected to some of the energy management systems.

Figure 3:
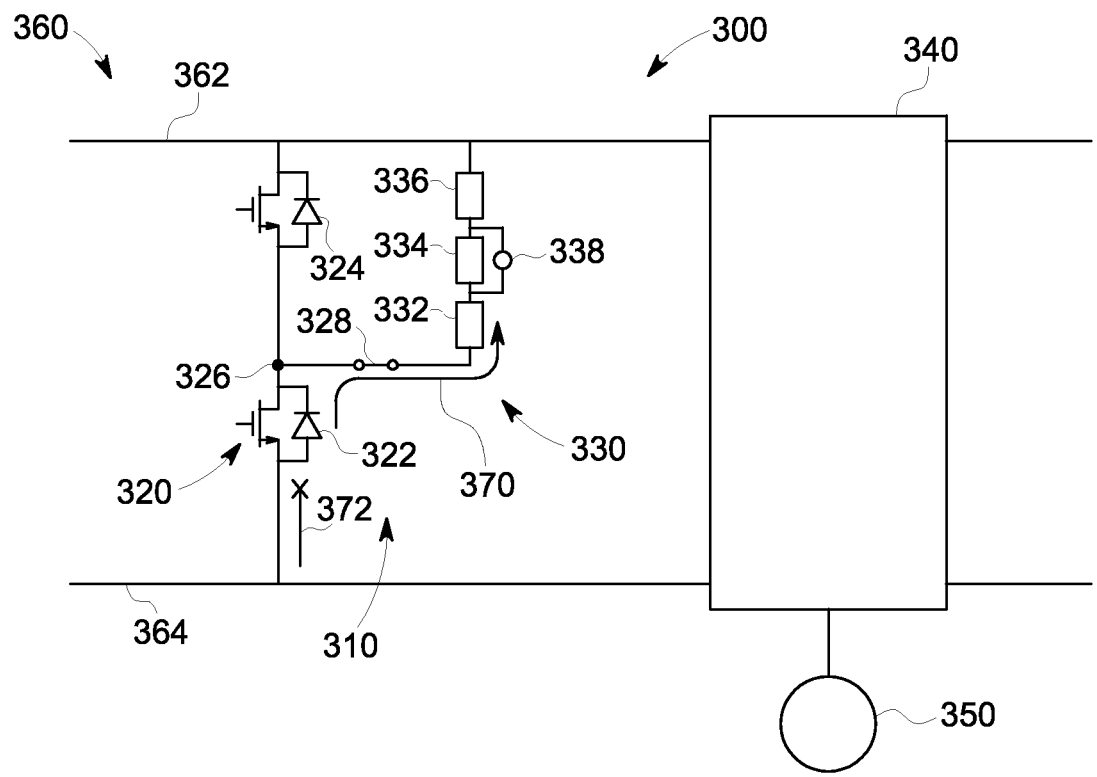
FIG. 3 is a schematic diagram of an embodiment of a system including a switching control system selectably connected to a plurality of energy management systems.

FIG. 3 illustrates a schematic view of a system 300 associated with a vehicle system in accordance with an embodiment. The system 300 includes an energy management system 310, a drive system 340, a traction motor 350, and a DC bus 360. The DC bus 360 includes a positive portion 362 and a negative portion 364. The energy management system 310 and drive system 340 are interposed between and operably connected to each end of the DC bus 360. The DC bus 360, in turn, is connected to a power source or sources (not shown). Thus, energy may be transferred, for example, between a power source or sources associated with the DC bus 360 and the drive system 340, or both. Further, energy may be transferred between the energy management system 310 and drive system 340 via the DC bus 360.

The drive system 340 is operably connected to the traction motor 350. For example, to propel the vehicle system, the drive system 340 uses energy obtained via the DC bus to power the traction motor 350 to turn an axle to propel the vehicle system forward. For dynamic braking, the propulsion system effectively acts as a generator, with energy from the drives distributed to the DC bus 360.

The energy management subsystem 310 includes a switching control system 320, and an energy dissipation system 330. In the illustrated embodiment the switching control system 320 includes a first switching module 322 and a second switching module 324, with the first switching module 322 and the second switching module 324 operably connected and in electrical communication with each other. Further, the first switching module 322 is connected to the negative portion 364 of the DC bus 360 and the second switching module 324 is connected to the positive portion 362 of the DC bus 360, so that the first switching module 322 and the second switching module 324 define a direct path between the negative portion 364 and the positive portion 362.

Also, each of the switching modules 322, 324 is movable between settings, for example from an on position or other on state where current is allowed to flow through the particular switching module to an off position or other off state where current is inhibited from flowing through the particular switching module, or as another example, a setting where the switching module functions like a diode, allowing current to flow only in a given direction while inhibiting current flow in the opposite direction. In the illustrated embodiment, the switching modules include IGBTs, but other components may be employed additionally or alternatively. To avoid a short between the negative portion 364 and the positive portion 362 of the DC bus 360, the first and second switching modules 322, 324 may be controlled such that at least one is maintained in an off position or other off state, or a position that inhibits current flow, at all times that the DC bus 360 receives power. As discussed elsewhere herein, the switching control system 320 is also connected to or forms a portion of other systems of the vehicle system, however these connections are omitted from FIG. 3 to improve clarity of particular aspects of the illustrated embodiment.

In the illustrated embodiment, the energy dissipation system 330 is configured to dissipate energy transferred from the drive system 340 via the DC bus 360. For example, energy from a dynamic braking activity may be transferred from the drive system 340, via the DC bus 360, to the energy management system 310. Further, during dynamic braking, a portion of the energy from the drive system 340 may be distributed to a battery (not shown in FIG. 3) to charge the battery for later use with other portions of the system (such as drive system 340 and traction motor 350). For example, in hybrid applications, energy from the dynamic braking activity may be used to charge the battery. However, the battery or other storage devices may not have the capacity to accept all of the energy generated by the dynamic braking activity. Thus, some energy may be transferred to the energy management system 310 for dissipation.

The energy dissipation system 330 includes a series of three resistors 332, 334, 336. The power dissipated by resistors is given by the equation $P=V^2/R$, where P is power, V is voltage across the resistors, and R is the resistance of the resistors. The resistors 332, 334, 336 become heated as they dissipate electrical energy, with the electrical energy being transformed to heat energy. The energy dissipation system 330 also includes a blower 338 configured to help remove heat energy generated by the resistors from the vehicle system.

The energy dissipation system 330 is selectably connected to the switching control system 320. In the illustrated embodiment, the energy dissipation system 330 is connected to the switching control system at point 326 interposed between the first switching module 322 and the second switching module 324. One end of the energy dissipation system is connected to the positive portion 362 of the DC bus 360. To select the switching control system for electrical communication with the energy dissipation system 330, a contact 328 located along the path connecting the energy dissipation system 330 with the switching control system 320 is closed. To de-select or disengage the electrical communication, the contact 328 is opened. In FIG. 3, the contact 328 is closed, with the second switching module 324 selected for electrical communication with the energy dissipation system 330.

The first switching module 322 and the second switching module 324 are used to control the path of current through the energy management system 310 (and the energy dissipation system 330) to control the amount of power dissipated when the contact 328 is closed. In the illustrated embodiment, a first path 370 is defined when the first switching module 322 is on (and the second switching module 324 by implication off). As seen in FIG. 3, the path 370 passes through the first switching module 322 and upward in the sense of the figure. Because the second switching module 324 is in off position or other off state (inhibiting current flow) and the contact 328 is closed, current thus flows through the resistive load of the energy dissipation system 330, allowing energy to be dissipated. Thus, by selecting the switching control system 320 for electrical communication with the energy dissipation system 330, and having the first switching module 322 in an on position or other on state, a current path is defined that allows energy, for example, electrical energy from a dynamic braking activity, to be dissipated.

As used herein, a path may be understood not just as a route along which current travels, but also as a combination of switching module settings, for example on/off configurations of a combination of switching modules. For example, when the first switching module 322 is in the off position or other off state, current is inhibited from flowing through the depicted energy management system 310. Thus, a configuration where the first switching module 322 is off may be considered as defining a path, though current is inhibited through the energy management system 310 for that particular path. This path is represented as 372 in FIG. 3, depicting a current prevented from passing through the first switching module 322.

Thus, whether or not the resistive load of the energy dissipation system 330 is connected and energy is dissipated may be controlled by the switching control system 320. Further still, the amount of energy dissipated may be controlled by the switching control system 320. This is accomplished in the illustrated embodiment by varying the amount of time that the first switching module 322 is in the on position or other on state, or allows the flow of current through the energy dissipation system 330.

Figure 4:
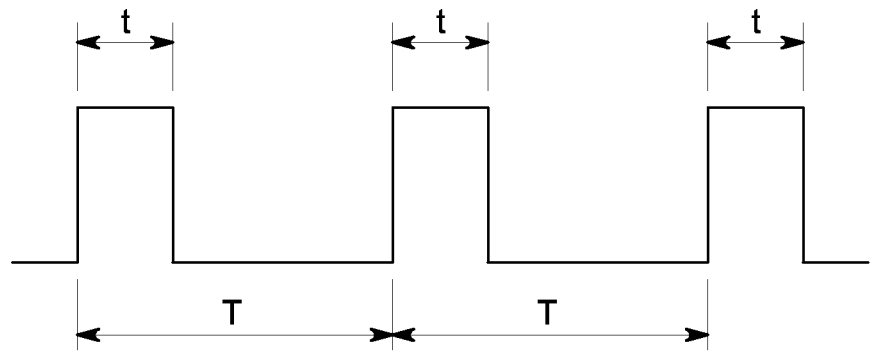
FIG. 4 illustrates a graph depicting a repeating pattern of a changing setting of a switching module.

FIG. 4 illustrates a graph representing the timing of a switching setting over time. In FIG. 4, the setting is on and off for corresponding repeating periods of time. In FIG. 4, t denotes the time period at which a switching module is at a given setting, with T representing the period over which the cycle of activating and de-activating the given setting occurs. In embodiments, the period T may be, for example, about 5 milliseconds. For example, with respect to FIG. 3, t may illustrate the amount of time that the first switching module is on for a given repeatable cycle, and t/T represents the ratio of that time to the entire period. t/T may also be stated as a percentage. Maximum energy dissipation is achieved when the first switching module 322 is continuously in an on position or other on state, or the resistive load of the energy dissipation system 330 is continuously connected to the DC bus 360. Lower amounts of dissipation are achieved by lowering the value of t/T.

The amount of power dissipated can be understood, using a modified form of the equation given above, as $P=(t/T)*V^2/R$. For example, when t is one-half of the value of T, one-half of the potential energy dissipated is dissipated. Thus, by controlling a ratio describing a time of a given setting for a switching module, or the pulse width of the switching module, an amount of energy transferred by an energy management system may be controlled. For example, a given dynamic braking grid, or resistive load, may have a capacity to dissipate about 400 kilowatts. If the vehicle system requires about 200 kilowatts of energy to be dissipated, then the ratio of t/T of the first switching module, may be set at about ½.

In embodiments the components of subsystem and systems may be split into other systems or combined into consolidated systems. Further, elements depicted as discreet elements in the figures may be joined with other components in embodiments. For example, portions of system 300, such as the switching control system 310 and the energy dissipation module 320, may also be a component of other systems (a shared component). Further a plurality of systems 310 may be employed in embodiments. For example, embodiments may include 5 or more switching control systems and associated energy dissipation modules arrayed in parallel. As another example, the switching control system 310 may be shared with a plurality of additional devices or systems discussed elsewhere herein, or with other types of systems or devices.

Figure 5:
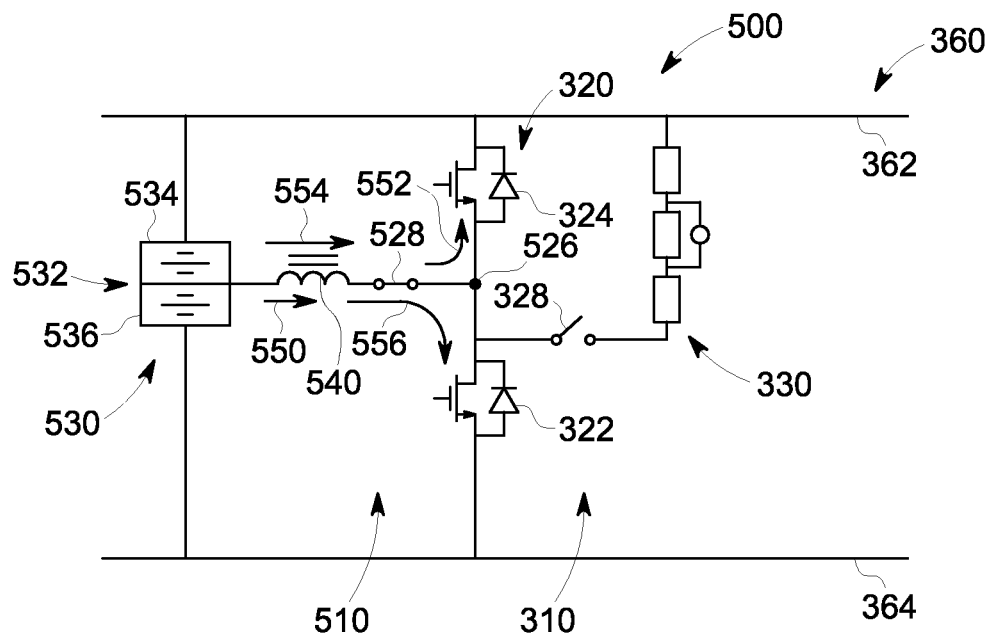
FIG. 5 is a schematic diagram of an embodiment of a system including a switching control system selectably connected to a plurality of energy management systems.

As indicated above, the switching control system 320 is also configured to be connected to other systems, and can also be a portion of other systems as well. FIG. 5 depicts a system 500 that also includes the switching control system 320. Certain, but not all aspects of the system 300 are represented in FIG. 5, with like numbers depicting the same or generally similar elements. Elements such as the traction drives may still remain, for example, connected to the DC bus, but are omitted from FIG. 5 for clarity.

The system 500 includes an energy management system 510 and a DC bus 360. The DC bus 360 includes a positive portion 362 and a negative portion 364. The energy management system 50 is interposed between and operably connected to each end of the DC bus 360. The DC bus 360, in turn, is connected to a power source or sources (not shown). Thus, energy may be transferred, for example, between a power source or sources associated with the DC bus 360 and the energy management system 510.

The energy management system 510 includes the switching control system 320, and an internal energy storage system 530. The switching control system 320 has been discussed above.

The internal energy storage system 530 of the illustrated embodiment is configured to perform a battery balancing activity. The internal energy storage system 530 includes a battery 532. The battery 532 may be charged through energy provided through the DC bus 360, and also may be used to provide energy to a system associated with the DC bus 360, for example the drives 340 and traction motor 350, or, as another example, an auxiliary drive associated with an auxiliary function of the vehicle system. The battery 532 in turn is comprised of a number of battery cells. For example, the battery 532 of the illustrated embodiment includes an upper battery bank 534 and a lower battery bank 536. Each bank is made up of many strings in parallel, with each string in turn made up of many cells in series. A large number of cells may be required for high voltage applications. For example, an application for a locomotive system may require as much as about 1000 volts, or more. To construct a battery 532 for such a system, the upper and lower banks 532, 534 may be connected in series, with each bank configured to provide about 500 volts. However, the banks may become unevenly charged. To address unevenly charged battery banks, the switching control system 320 may be selected for the internal energy storage system 530 to balance the battery 532.

The internal energy storage system 530 is selectably connected to the switching control system 320. In the illustrated embodiment, the internal energy storage system 530 is connected to the switching control system 320 at point 526 that is interposed between the first switching module 322 and the second switching module 324. To select the switching control system 320 for electrical communication with the internal energy storage system 530, a contact 528 located along the path connecting the internal energy storage system 530 with the switching control system 320 is closed. To de-select or disengage the electrical communication, the contact 528 is opened. In FIG. 5, the contact 528 is closed, with the switching control system 320 selected for electrical communication with the internal energy storage system 530. The contact 328 is open in FIG. 5, indicating that the switching control system 320 has been removed from electrical communication with the energy dissipation system 330, or de-selected from the energy dissipation system 330.

In certain embodiments, it may be impractical or undesirable for the switching control system to be selected for electrical communication with more than one module at the same time. Thus, in embodiments, the switching control system 320 may have a protective system associated therewith to prevent the switching control system 320 from being selected by more than one module or system at a time. This protective system, along with other control functions, such as selecting and de-selecting switching systems and energy management systems for electrical communication, as well as the timing of moving the switching modules between various settings, may be controlled, for example, by a control system dedicated to the switching module, a central control system associated with the vehicle system, by a control system associated with additional portions of the vehicle system, or a combination thereof.

In the embodiment of FIG. 5, a path including an inductor 540 and the contact 528 extends between the battery 532 (and both banks of the battery) and the point 526, connecting the internal energy storage system 530 to the switching control system 320, and placing the internal energy storage system 530 and the switching control system 320 in electrical communication when the contact 528 is closed. Also, the upper bank 534 of the battery 532 is linked to the positive portion 362 of the DC bus, and the lower bank 536 of the battery 532 is linked to the negative portion 364 of the DC bus 360.

By controlling the settings of the first switching module 322 and the second switching module 324 when the contact 528 is closed, the path of current associated with the internal energy storage system 530 may be selected and varied.

For example, the lower bank 536 may have a higher voltage than the upper bank 534. The switching control system 320 may be employed to balance the voltage of the battery banks. In the illustrated embodiment, when the lower bank 536 has more voltage, a battery balancing activity may begin by putting the first switching module 322 in the on position or other on state. This allows current to flow along path 550 (from lower bank 536 through inductor 540 toward point 526 and through the first switching module 322), thereby discharging the lower bank 536 into the inductor 540. Then, the first switching module 322 may be moved to the off position or other off state, and, with the second switching module 324, for example, acting as a diode allowing current to flow upward in the sense of FIG. 5, current may then flow along path 552 (from inductor 540 through point 526, through the second switching module 324, and into the upper battery bank 532). Thus, the inductor 540 may discharge into the upper battery bank 532 along path 552.

By varying the settings of the switching modules, for example as discussed above, energy may be transferred from the lower bank 536 to the upper bank 534. For example, this may be accomplished in a two stage process, where the lower bank 536 discharges into the inductor 540 in a first stage associated with path 550, and the inductor 540 discharges into the upper bank 534 in a second stage associated with path 552. The paths are defined by the settings of the switching modules—path 550 when the first switching module 322 is on, and path 552 when the first switching module 324 is off and the second switching module 324 acts as a diode. Similar to the above discussion regarding the energy dissipation module, the pulse width of the first switching module (or the amount of time that the first switching module is in the on position or other on state) may be used to control the transfer of energy from the lower bank to the upper bank.

Similarly, the lower bank 536 may have a lower voltage than the upper bank 534. Again, the switching control system 320 may be employed to balance the voltage of the battery banks. In the illustrated embodiment, when the upper bank 534 has more voltage, a battery balancing activity may begin by putting the second switching module 324 in the on position or other on state. This allows current to flow along path 554 (from the upper bank 534 through the inductor 540 toward the point 526), thereby discharging the upper bank 534 into the inductor 540. Then, the second switching module 324 may be moved to the off position or other off state, and, with the first switching module 322, for example, acting as a diode allowing current to pass in a downward direction in the sense of FIG. 5, current may then flow along path 556 (from inductor 540 through point 526, through the first switching module 322, and into the lower battery bank 533. Thus, the inductor 540 may discharge into the lower battery bank 534 along path 556.

By varying the settings of the switching modules, for example as discussed above, energy may be transferred from the upper bank 534 to the lower bank 536. For example, this may be accomplished in a two stage process, where the upper bank 534 discharges into the inductor 540 in a first stage associated with path 554, and the inductor 540 discharges into the lower bank 536 in a second stage associated with path 556. The paths are defined by the settings of the switching modules—path 554 when the second switching module 324 is on, and path 556 when the second switching module 322 is off and the first switching module 322 acts as a diode. Also, the pulse width of the second switching module may be used to control the transfer of energy from the lower bank to the upper bank. It should be noted that the particular arrangements of paths or timing of pathways discussed herein are meant by way of example, and that other paths or timing schemes may be employed in other embodiments.

Figure 6:
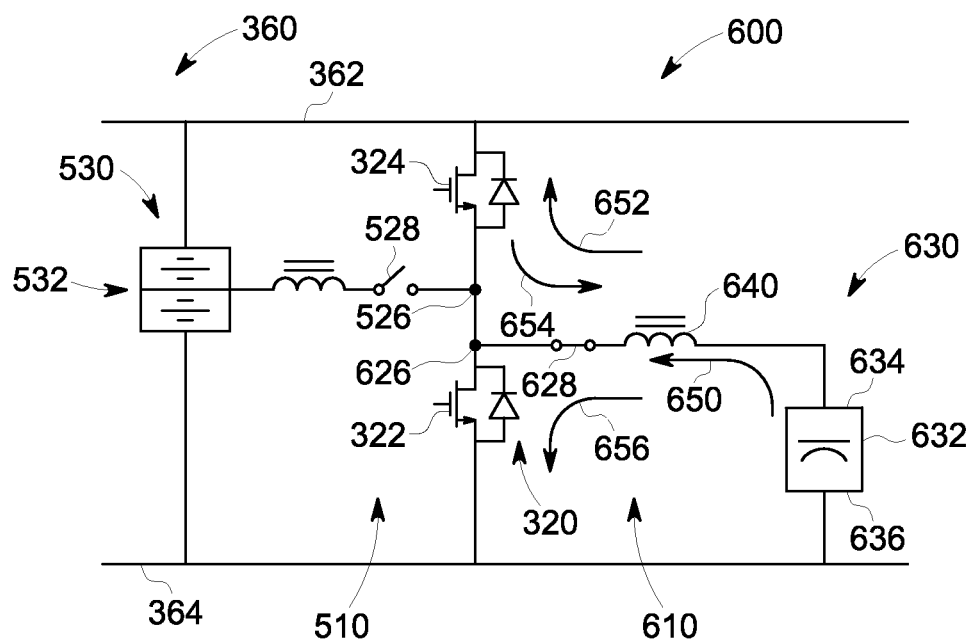
FIG. 6 is a schematic diagram of an embodiment of a system including a switching control system selectably connected to a plurality of energy management systems.

As indicated above, the switching control system 320 is also configured to be connected to other systems additionally or alternatively, and can also be a portion of other systems as well. As indicated above, additional types of internal energy storage systems may be employed additionally or alternatively. FIG. 6 depicts a system 600 that also includes the switching control system 320 selectably connected to an additional internal energy storage system. Certain, but not all aspects of the systems 300, 500 previously depicted in FIGS. 3 and 5 are represented in FIG. 6, with like numbers depicting the same or generally similar elements. Elements such as the traction drives may still remain, for example, connected to the DC bus, and elements such as the energy dissipation system 330 may still remain connected to the switching control system, but are omitted from FIG. 6 for clarity.

The system 600 includes an energy management subsystem 610 and a DC bus 360. The DC bus 360 includes a positive portion 362 and a negative portion 364. The energy management system 610 is interposed between and operably connected to each end of the DC bus 360. The DC bus 360, in turn, is connected to a power source or sources (not shown). Thus, energy may be transferred, for example, between a power source or sources associated with the DC bus 360 (such as the battery 532) and the energy management system 610.

The energy management subsystem 610 includes the switching control system 320, and an internal energy storage system 630. The switching control system 320 has been discussed above.

The internal energy storage system 630 of the illustrated embodiment is configured to provide energy storage and discharge via an energy storage capacitor. Energy storage via a capacitor allows for quicker charging and discharging than with a battery. Thus, while a capacitor may not be as useful as a battery for applications where longer term, steadier power supply is required, a capacitor may be advantageously utilized in instances where a generally large amount of power transfer is desired in a generally short amount of time. For example, a capacitor may be used in a vehicle system in conjunction with a battery, with the capacitor used in circumstances where it is desired to receive a generally large amount of power quickly, with the capacitor receiving the generally large amount of power quickly, and then later transferring energy from the capacitor to the battery.

The internal energy storage system 630 includes a capacitor 632. The capacitor 632 may be charged through energy provided through the DC bus 360, for example energy provided by a dynamic braking activity, or as another example, energy from a battery associated with the DC bus such as battery 532. The capacitor 632 and also may be used to provide energy to a system associated with the DC bus 360, for example the drives 340 and traction motor 350, or, as another example, a battery associated with the DC bus such as battery 532. The capacitor 632 of the illustrated embodiment in turn is comprised of a number of individual capacitors.

The internal energy storage system 630 is selectably connected to the switching control system 320. In the illustrated embodiment, the internal energy storage system 630 is connected to the switching control system 320 at point 626 that, similar to point 526, is interposed between the first switching module 322 and the second switching module 324. To select the switching control system 320 for electrical communication with the internal energy storage system 630, a contact 628 located along the path connecting the internal energy storage system 630 with the switching control system 320 is closed. To de-select or disengage the electrical communication, the contact 628 is opened. In FIG. 6, the contact 628 is closed, with the switching control system 320 selected for electrical communication with the internal energy storage system 630. The contact 528 is open in FIG. 6, indicating that the switching control system 320 has been removed from electrical communication with the internal energy storage system 530 including the battery 532.

In the embodiment of FIG. 6, a path including an inductor 640 and the contact 628 extends from a first end 634 of the capacitor 632 to the point 626, connecting the internal energy storage system 630 to the switching control system 320, and placing the internal energy storage system 630 and the switching control system 320 in electrical communication when the contact 628 is closed. Also, in the illustrated embodiment, a second end 636 of the capacitor 632 is linked to the negative portion 364 of the DC bus 360.

By controlling the settings of the first switching module 322 and the second switching module 324 when the contact 628 is closed, the path of current associated with the internal energy storage system 630 may be selected and varied to control charging or discharging of the capacitor 632.

For example, the capacitor 632 may be used to provide energy to the DC bus 360, for example to the battery 532 associated with the DC bus 360. The switching control system 320 may be employed to control the transfer of energy from the capacitor 632 to the DC bus 360. For example, in the illustrated embodiment, a capacitor discharging activity may begin by putting the first switching module 322 in the on position or other on state. This allows current to flow along path 650 (from the first end 634 of the capacitor 632 through the inductor 640 toward point 626), thereby discharging the capacitor 632 into the inductor 640. Then, the first switching module 322 may be moved to the off position or other off state, and, with the second switching module 324, for example, acting as a diode allowing current to flow upward in the sense of FIG. 6, current may then flow along path 652 (from the inductor 640 through point 626, through the second switching module 324, and to the DC bus 360). Thus, the inductor 640 may discharge into the DC bus 360 along path 652.

By varying the settings of the switching modules, for example as discussed above, energy may be transferred from the capacitor 632 to the DC bus 360. For example, this may be accomplished in a two stage process, where the capacitor 632 discharges into the inductor 640 in a first stage associated with path 650, and the inductor 640 discharges into the DC bus 360 in a second stage associated with path 652. The paths are defined by the settings of the switching modules—path 650 when the first switching module 322 is on, and path 652 when the first switching module 324 is off and the second switching module 324 acts as a diode. Similar to the above discussion regarding the energy dissipation module, the pulse width of the first switching module may be used to control the transfer of energy from the capacitor 632.

Similarly, it may be desired to charge the capacitor 632. Again, the switching control system 320 may be employed to control the transfer of energy to the capacitor 632. In the illustrated embodiment, a capacitor charging activity may begin by putting the second switching module 324 in the on position or other on state. This allows current to flow along path 654 (from the DC bus 360 through the inductor 640 toward the point 626), thereby charging the inductor 640 from the DC bus 360. Then, the second switching module 324 may be moved to the off position or other off state, and, with the first switching module 322, for example, acting as a diode allowing current to pass in a downward direction in the sense of FIG. 6, current may then flow along path 656 (from the inductor 640 through point 626, through the first switching module 322, and to the second end 636 of the capacitor 632). Thus, the inductor 640 may discharge into the capacitor 632 along path 656.

Once again, by varying the settings of the switching modules, for example as discussed above, energy may be transferred from the DC bus 360 to the capacitor 632. For example, this may be accomplished in a two stage process, where the DC bus 360 discharges into the inductor 640 in a first stage associated with path 654, and the inductor 640 discharges into the capacitor 632 in a second stage associated with path 656. The paths are defined by the settings of the switching modules—path 654 when the second switching module 324 is on, and path 656 when the second switching module 322 is off and the first switching module 322 acts as a diode. Again, the pulse width of the second switching module may be used to control the transfer of energy from the DC bus 360 to the capacitor 632.

Figure 7:
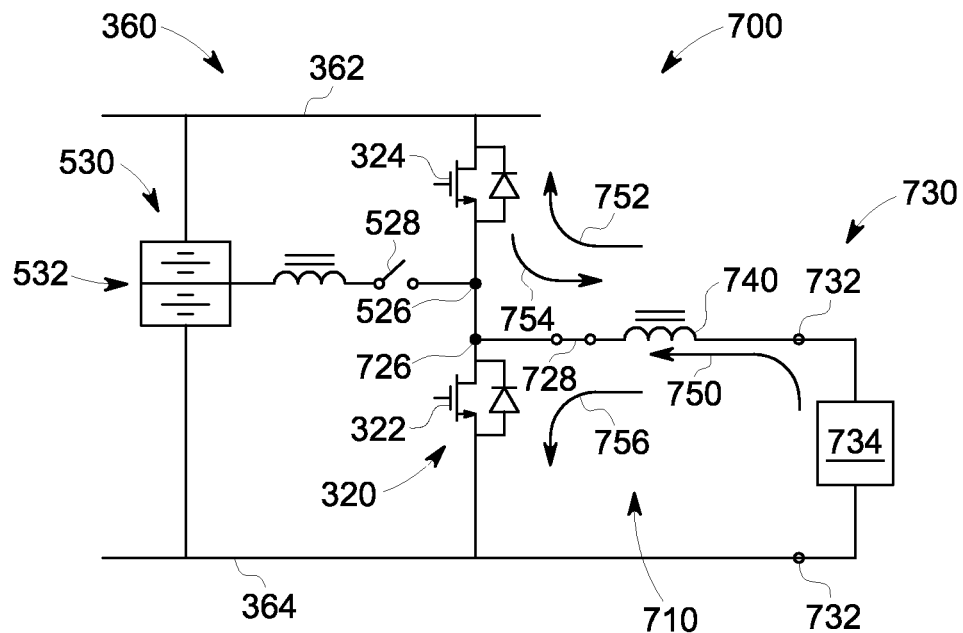
FIG. 7 is a schematic diagram of an embodiment of a system including a switching control system selectably connected to a plurality of energy management systems.

As mentioned above, the switching control system 320 is also configured to be connected to other systems, and can also be a portion of other systems as well. For example, the switching control system 320 may also be connected with external charging systems in addition to internal energy storage systems and energy dissipation systems. FIG. 7 depicts a system 700 that also includes the switching control system 320 selectably connected to an external energy charging system. Certain, but not all aspects of the systems 300, 500, and 600 previously depicted are represented in FIG. 7, with like numbers depicting the same or generally similar elements. Elements such as the traction drives may still remain, for example, connected to the DC bus, and elements such as the energy dissipation system 330 or the internal energy storage system 630 may still remain connected to the switching control system, but are omitted from FIG. 7 for clarity.

The system 700 includes an energy management subsystem 710 and a DC bus 360. The DC bus 360 includes a positive portion 362 and a negative portion 364. The energy management system 710 is interposed between and operably connected to each end of the DC bus 360. Thus, energy may be transferred, for example, between a power source or sources associated with the DC bus 360 (such as the battery 532) and the energy management system 710.

The energy management subsystem 710 includes the switching control system 320, and an external energy charging system 730. The switching control system 320 has been discussed above.

The external energy charging system 730 of the illustrated embodiments is configured to provide energy transfer between the vehicle system and an external energy source. This allows a vehicle system to receive a charge for use or storage to supplement or replace the need for an energy generating source disposed within or mounted to the vehicle system itself.

The external energy charging system 730 includes an interface 732 for connecting to an external energy source. In the embodiment depicted in FIG. 7, the external energy source is a third rail 734, and the interface 732 is configured to link the third rail 734 with the vehicle system, for example, a portion of the DC bus 360. The third rail 734 may receive energy provided from the vehicle system through the DC bus 360, or the third rail 734 may be used to provide energy to a system associated with the DC bus 360, for example the drives 340 and traction motor 350, or, as another example, a battery associated with the DC bus such as battery 532.

The external energy charging system 730 is selectably connected to the switching control system 320. In the illustrated embodiment, the external energy charging system 730 is connected to the switching control system 320 at point 726 that, similar to points 526, and 626, is interposed between the first switching module 322 and the second switching module 324. To select the switching control system 320 for electrical communication with the external energy charging system 730, a contact 728 located along the path connecting the external energy charging system 730 with the switching control system 320 is closed. To de-select or disengage the electrical communication, the contact 728 is opened. In FIG. 7, the contact 728 is closed, with the switching control system 320 selected for electrical communication with the external energy charging system 730.

In the embodiment of FIG. 7, a path including an inductor 740 and the contact 728 extends from the third rail 734 to the point 726, connecting the third rail 734 (and external energy charging system 730) to the switching control system 320, and placing the external energy charging system 730 and the switching control system 320 in electrical communication when the contact 728 is closed. Also, in the illustrated embodiment, the third rail 734 is linked to the negative portion 364 of the DC bus 360.

By controlling the settings of the first switching module 322 and the second switching module 324 when the contact 728 is closed, the path of current associated with the external energy charging system 730 may be selected and varied to control transfer of energy with the third rail 734.

For example, the third rail 734 may be used to provide energy to the DC bus 360, for example to the battery 532 associated with the DC bus 360. The switching control system 320 may be employed to control the transfer of energy from the third rail 734 to the DC bus 360. For example, in the illustrated embodiment, a charging activity may begin by putting the first switching module 322 in the on position or other on state. This allows current to flow along path 750 (from the third rail 734 through the inductor 740 toward point 726), thereby discharging the third rail 734 into the inductor 740. Then, the first switching module 322 may be moved to the off position or other off state, and, with the second switching module 324, for example, acting as a diode allowing current to flow upward in the sense of FIG. 7, current may then flow along path 752 (from the inductor 740 through point 726, through the second switching module 324, and to the DC bus 360). Thus, the inductor 740 may discharge into the DC bus 360 along path 752.

Thus, by varying the settings of the switching modules, for example as discussed above, energy may be transferred from the third rail 734 to the DC bus 360. For example, this may be accomplished in a two stage process, where the third rail 734 discharges into the inductor 740 in a first stage associated with path 750, and the inductor 740 discharges into the DC bus 360 in a second stage associated with path 752. The paths are defined by the settings of the switching modules—path 750 when the first switching module 322 is on, and path 752 when the first switching module 324 is off and the second switching module 324 acts as a diode. Also, the pulse width of the first switching module 322 may be used to control the transfer of energy from the third rail 734. For example, with the third rail at a lower voltage than the battery, the pulse width may be controlled to allow enough time for sufficient voltage to build in the inductor to provide energy to the battery. Generally, a longer t (corresponding to path 750) provides for a greater voltage increase.

Similarly, it may be desired to provide energy to the third rail 734 from the DC bus 360. Again, the switching control system 320 may be employed to control the transfer of energy to the third rail 734. In the illustrated embodiment, a discharging activity may begin by putting the second switching module 324 in the on position or other on state. This allows current to flow along path 754 (from the DC bus 360 through the inductor 740 toward the point 726), thereby charging the inductor 740 from the DC bus 360. Then, the second switching module 324 may be moved to the off position or other off state, and, with the first switching module 322, for example, acting as a diode allowing current to pass in a downward direction in the sense of FIG. 6, current may then flow along path 756 (from the inductor 740 through point 726, through the first switching module 322, and to the third rail 734). Thus, the inductor 740 may discharge into the third rail 734 along path 756.

Once again, by varying the settings of the switching modules, for example as discussed above, energy may be transferred from the DC bus 360 to the third rail 734. For example, this may be accomplished in a two stage process, where the DC bus 360 discharges into the inductor 740 in a first stage associated with path 754, and the inductor 740 discharges into the third rail 734 in a second stage associated with path 756. The paths are defined by the settings of the switching modules—path 754 when the second switching module 324 is on, and path 756 when the second switching module 322 is off and the first switching module 322 acts as a diode. Again, the pulse width of the second switching module may be used to control the transfer of energy from the DC bus 360 to the third rail 734.

Figure 8:
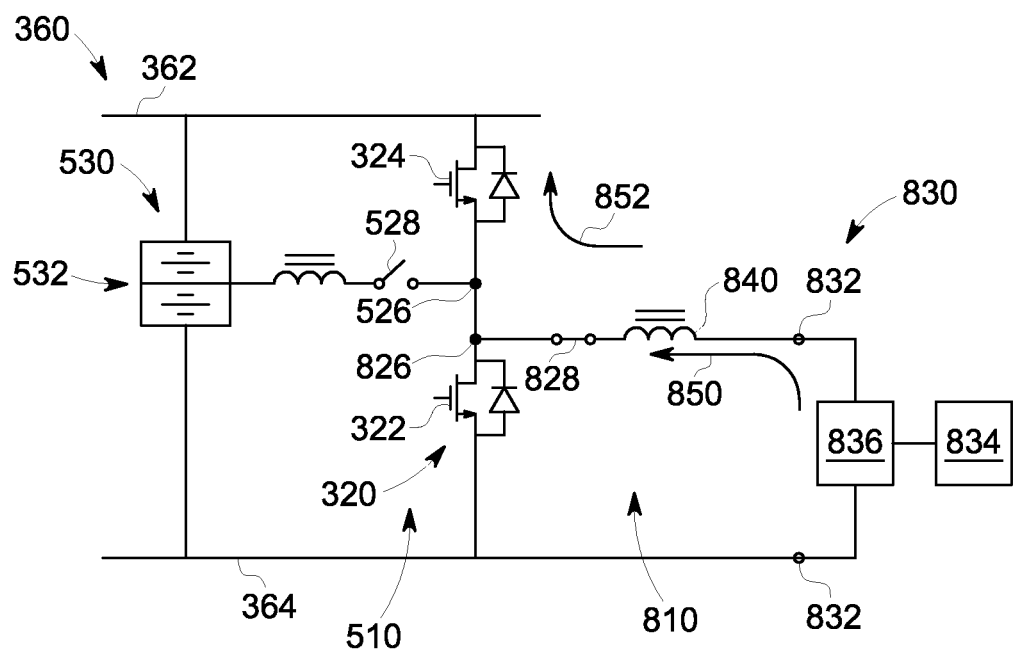
FIG. 8 is a schematic diagram of an embodiment of a system including a switching control system selectably connected to a plurality of energy management systems.

Alternatively or additionally, the switching control system 320 may also be used in conjunction with different types of external charging systems in addition to, for example, the external energy charging system 700 discussed above configured for use with a third rail. For example, the third rail discussed above provides an example of an external energy source accessible while the vehicle system is moving. Other external energy sources may be accessible when the vehicle system is stopped at a predetermined location, such as a charging station. FIG. 8 depicts a system 800 that also includes the switching control system 320 selectably connected to an external energy charging system, for example, a bayside charging station. Certain, but not all aspects of the systems 300, 500, 600, and 700 previously depicted are represented in FIG. 8, with like numbers depicting the same or generally similar elements. Elements such as the traction drives may still remain, for example, connected to the DC bus, and elements such as the energy dissipation system 330 or the internal energy storage system 630 may still remain connected to the switching control system, but are omitted from FIG. 8 for clarity.

The system 800 includes an energy management subsystem 810 and a DC bus 360. The DC bus 360 includes a positive portion 362 and a negative portion 364. The energy management system 810 is interposed between and operably connected to each end of the DC bus 360. Thus, energy may be transferred, for example, between a power source or sources associated with the DC bus 360 (such as the battery 532) and the energy management system 810.

The energy management subsystem 810 includes the switching control system 320, and an external energy charging system 830. The switching control system 320 has been discussed above.

The external energy charging system 830 of the illustrated embodiments is configured to provide energy transfer between the vehicle system and an external alternating current (AC) source. This allows a vehicle system to receive a charge for use or storage to supplement or replace the need for an energy generating source disposed within or mounted to the vehicle system, or onboard the vehicle system.

The external energy charging system 830 includes an interface 832 for connecting to an external energy source. The interface 832 is configured to link the external AC source 834 with the vehicle system, for example a portion of the DC bus 360. For example, the interface 832 may comprise a plug configured to be inserted into a receptacle of the external energy source. In the embodiment depicted in FIG. 8, the external AC source 834 has associated therewith a rectifier 836. The rectifier 836 may be permanently connected to the external AC source 834, the vehicle system, or neither. In the illustrated embodiment, the rectifier 836 is removably connected to the external energy charging system 830 via the interface 832. Alternatively, for example, the rectifier 836 may be located on-board a vehicle system, with the interface 832 interposed between the external AC source 834 and the rectifier 836. The external AC source 834 may be used to provide energy to a system associated with the DC bus 360, for example a battery associated with the DC bus such as battery 532.

The external energy charging system 830 is selectably connected to the switching control system 320. In the illustrated embodiment, the external energy charging system 830 is connected to the switching control system 320 at point 826 that, similar to points 526, 626, and 726, is interposed between the first switching module 322 and the second switching module 324. To select the switching control system 320 for electrical communication with the external energy charging system 830, a contact 828 located along the path connecting the external energy charging system 830 with the switching control system 320 is closed. To de-select or disengage the electrical communication, the contact 828 is opened. In FIG. 8, the contact 828 is closed, with the switching control system 320 selected for electrical communication with the external energy charging system 830.

In the embodiment of FIG. 8, a path including an inductor 840 and the contact 828 extends from the external AC source 834 to the point 826, connecting the external AC source 834 (and external energy charging system 830) to the switching control system 320, and placing the external energy charging system 830 and the switching control system 320 in electrical communication when the contact 828 is closed. Also, in the illustrated embodiment, the external AC source 834 is linked to the negative portion 364 of the DC bus 360.

By controlling the settings of the first switching module 322 and the second switching module 324 when the contact 828 is closed, the path of current associated with the external energy charging system 830 may be selected and varied to control transfer of energy with the external AC source 834.

For example, the external AC source 834 may be used to provide energy to the DC bus 360, for example to the battery 532 associated with the DC bus 360. The switching control system 320 may be employed to control the transfer of energy from the external AC source 834 to the DC bus 360. For example, in the illustrated embodiment, a charging activity may begin by putting the first switching module 322 in the on position or other on state. This allows current to flow along path 850 (from the external AC source 834 through the inductor 840 toward point 826), thereby discharging the external AC source 834 into the inductor 840. Then, the first switching module 322 may be moved to the off position or other off state, and, with the second switching module 324, for example, acting as a diode allowing current to flow upward in the sense of FIG. 8, current may then flow along path 852 (from the inductor 840 through point 826, through the second switching module 324, and to the DC bus 360). Thus, the inductor 840 may discharge into the DC bus 360 along path 852.

Thus, by varying the settings of the switching modules, for example as discussed above, energy may be transferred from external AC source 834 to the DC bus 360. For example, this may be accomplished in a two stage process, where the external AC source 834 discharges into the inductor 840 in a first stage associated with path 850, and the inductor 840 discharges into the DC bus 360 in a second stage associated with path 852. The paths are defined by the settings of the switching modules—path 850 when the first switching module 322 is on, and path 852 when the first switching module 324 is off and the second switching module 324 acts as a diode. Again, the pulse width of the first switching module 322 may be used to control the transfer of energy from the external AC source 834.

Figure 9:
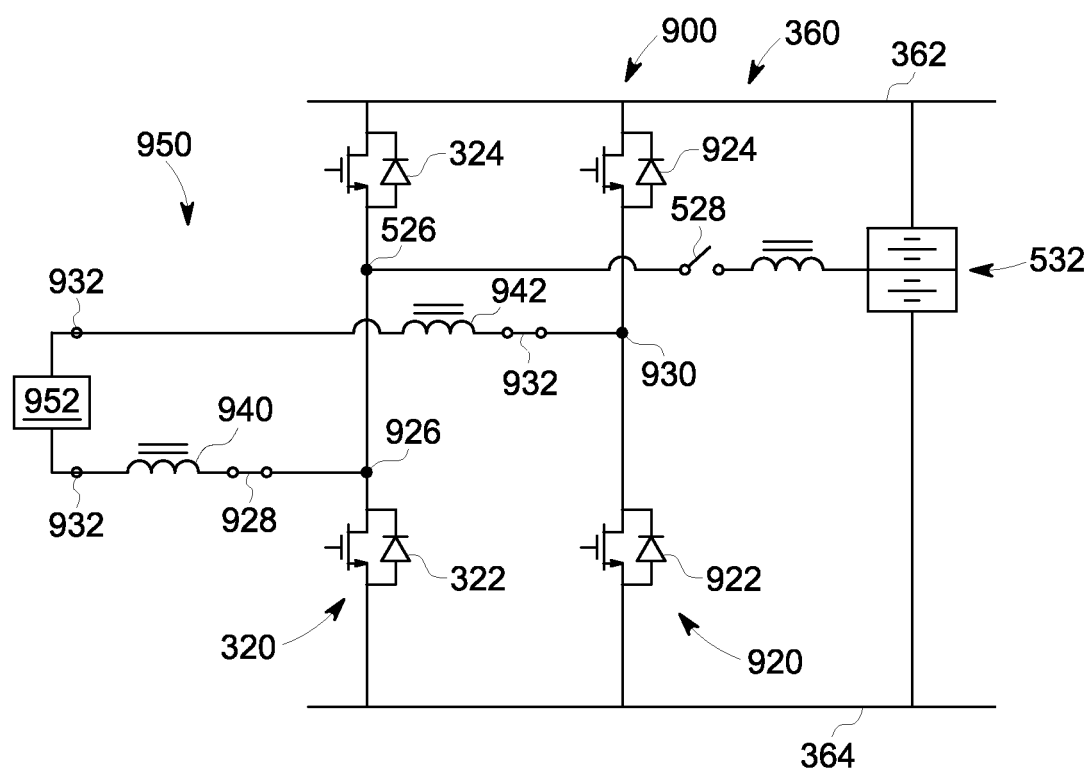
FIG. 9 is a schematic diagram of an embodiment of a system including a switching control system selectably connected to a plurality of energy management systems.

Still other types of external energy charging systems may be used in conjunction with the switching control system 320. For example, FIG. 9 illustrates a system 900 formed in accordance with an embodiment. The system 900 is similar in certain general respects to the system 800 discussed above, however, for example, system 900 includes a second switching control system 920 along with the switching control system 320, and does not include the rectifier 836. The system 900 is configured for active front end AC source charging from an external AC source 952. In the illustrated embodiment, the external AC source 952 provides 1 phase AC. In other embodiments, for example, external energy charging systems may be configured to provide 3 phase AC. The external AC source 952 is in some embodiments associated with a charging system, such as a charging station, that is connected to the vehicle system while the vehicle system is at rest. In other embodiments, the external AC source 952 may provide energy to the vehicle system while the vehicle system is in motion, such as via a catenary.

The second switching control system 920 includes a third switching module 922 and a fourth switching module 924. The third switching module 922 and fourth switching module 924 may be generally similar in many respects to the first and second switching modules 322, 324. Further, the third switching module 922 and fourth switching module 924 may be selectably connected to other energy transfer systems, such as energy transfer systems discussed above, and may function as the first and second switching module with respect to those other energy transfer systems. The third switching module 922 and the fourth switching module 924 are operably connected and in electrical communication with each other. Further, the third switching module 922 is connected to the negative portion of the DC bus 360 and the fourth switching module 924 is connected to the positive portion 362 of the DC bus 360, so that the third switching module 922 and the fourth switching module 924 define a direct path between the negative portion 364 and the positive portion 362.

The external energy charging system 950 includes an interface 932 for connecting to an external energy source. The interface 932 is configured to link the external AC source 952 with the vehicle system, for example a portion of the DC bus 360. For example, the interface 932 may comprise a plug configured to be inserted into a receptacle of the external energy source.

The external energy charging system 950 is selectably connected to the switching control system 320 as well as the second switching control system 920. In the illustrated embodiment, one end of the external energy charging system 950 is connected to the switching control system 320 at point 926 that is interposed between the first switching module 322 and the second switching module 324. Also, the other end of the external energy charging system 950 is connected to the second switching control system 920 at point 930 that is interposed between the third switching module 922 and the fourth switching module 924. To select the switching control system 320 for electrical communication with the external energy charging system 950, a contact 928 located along the path connecting the external energy charging system 950 with the switching control system 320 is closed, as is a contact 932 located along the path connecting the external energy charging system 950 with the second switching control system 920. To de-select or disengage the electrical communication, the contacts 928, 932 are opened. In FIG. 9, the contacts 928, 930 are closed, with the switching control system 320 and the second switching control system 920 selected for electrical communication with the external energy charging system 950.

In the embodiment of FIG. 9, a path including an inductor 940 and the contact 928 extends from the external AC source 952 to the point 926, connecting the external AC source 952 (and external energy charging system 950) to the switching control system 320, and placing the external energy charging system 950 and the switching control system 320 in electrical communication when the contact 928 is closed. Further, a second path including an inductor 942 and the contact 932 extends from the external AC source 952 to the point 930, connecting the external AC source 952 (and external energy charging system 950) to the second switching control system 920, and placing the external energy charging system 950 and the second switching control system 920 in electrical communication when the contact 932 is closed. Also, in the illustrated embodiment, the external AC source 952 is linked to the negative portion 364 of the DC bus 360. It should be noted that in connection with this embodiment as well as other embodiments, various elements or components, for example inductors, identified as discreet components in the figures may or may not be embodied as discreet components in additional embodiments.

The settings of the first switching module 322, the second switching module 324, the third switch module 922, and the fourth switching module 924 may be controlled to control transfer of energy with the external AC source 952. Numerous combinations may be used, for example, for charging, discharging, or power factor control. For example, when the AC from the external AC source 952 is positive, the third switching module 922 may be placed in an on position or other on state, with the first switching module 322 acting as a diode, allowing current to build up in one or more inductors. Then, the third switching module 922 may be moved to the off position or other off state, and energy transferred to the DC bus 360 through the first switching module 322 and the fourth switching module 924.

Systems formed in accordance with embodiments of the present inventive subject matter, such as those embodiments discussed specifically in detail above, thus provide a reduced footprint for hardware, including switching control systems, associated with energy management and transfer systems of a vehicle system. Switching control systems adapted for shared use with a variety of energy management systems, such as energy transfer systems, provide for reduced space requirements and/or reduced maintenance costs and/or operating costs. In certain embodiments, synchronization plurality of shared switching control systems may be included.

Figure 10:
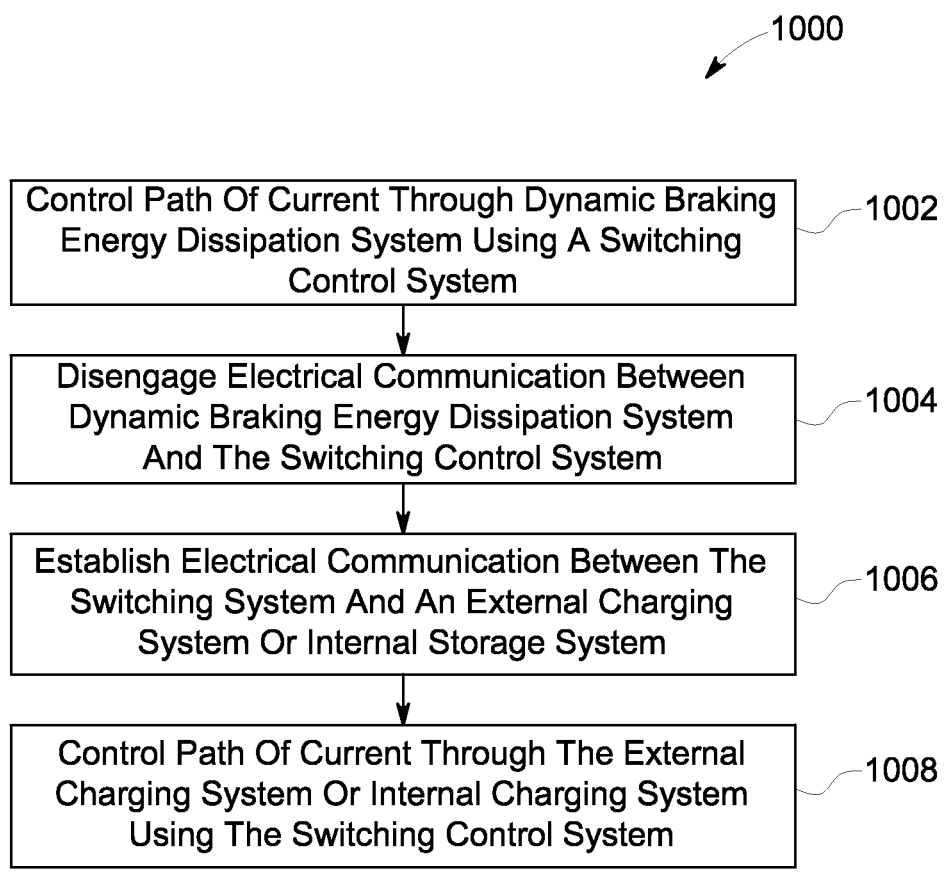
FIG. 10 is a flowchart of one embodiment of a method for controlling a plurality of energy management systems.

FIG. 10 provides a flowchart depicting a method 1000 for controlling certain energy management tasks, for example, in a vehicle system. In certain embodiments, certain operations may be added or omitted, certain steps may be combined, certain steps may be split into one or more steps, certain steps may be performed simultaneously with other steps, certain steps may be performed in different order, and certain steps may be performed more than once, for example, in an iterative fashion.

For the embodiment depicted in FIG. 10, a vehicle system with energy management tasks to be performed includes a switching system that is selectably connected with a dynamic energy braking dissipation system and at least one of an external charging system or an internal storage systems. Such systems could include, for example, systems generally similar to those discussed above.

For the depicted embodiment, the method begins with the switching system selected for electrical communication with the dynamic energy braking dissipation system. At 1002, a path of current through a dynamic braking energy dissipation module is controlled using the switching system. In the depicted embodiment, after a certain time has passed, dynamic braking is no longer being performed by the vehicle system (or is being performed, for example, at a reduced level so that the dynamic energy braking dissipation system is no longer required to dissipate energy). Thus, the switching system may be released from the dynamic energy braking dissipation system for use with a different energy management system.

Accordingly, at 1004, the electrical communication between the switching system and the dynamic braking energy dissipation module is disengaged. At 1006, electrical communication between the switching system and one of the at least one of an external charging system or internal storage system is established. At 1008, a path of current through the at least one of an external charging system or internal storage system in electrical communication with the switching system is controlled using the switching system. Thus, for example, a single switching system may be shared between a plurality of energy management systems selectably connected to the switching system.

In embodiments, a plurality of switching systems may be independently selectably connected to some or all of the energy management systems, providing flexibility if more than one energy management system is to be used at once. As but one example, a vehicle system may include a dynamic braking energy dissipation system, a battery balancing system, an energy storage capacitor system, and an external charging system. A first switching control system and a second switching control system may each be selectably connected to the aforementioned systems. At some point during the operation of the vehicle system, it may be desired to perform dynamic braking, and to dissipate some or all of the energy generated by the dynamic braking. Simultaneously, it may be desired to provide energy for storage in the energy storage capacitor (which, for example, may be configured to accept a relatively large amount of energy in a short amount of time from the dynamic braking activity). The first switching control system may then be selected for the dynamic braking energy dissipation system, and the second switching control system selected for the energy storage capacitor system. Thus, both systems may be controlled at once. The above is meant by way of example only, and a wide variety of other combinations are possible.

In another embodiment, a control system includes a first switching module and a second switching module. The second switching module is operably connected to the first switching module. The control system is configured to be selectably connected to at least two of an energy dissipation system, an external energy storage system, or an internal energy storage system. The energy dissipation system is configured to dissipate energy associated with a vehicle system. The external energy charging system is configured to provide energy from a source external to the vehicle system for storage by the internal energy storage system. The internal energy storage system is configured to store energy for use by the vehicle system. When the control system is selected for electrical communication with one of the at least two of an energy dissipation system, external energy charging system, or internal energy storage system, the first and second switching modules control the path of a current distributed through the one of the at least two of an energy dissipation system, external energy charging system, or internal energy storage system.

In another aspect, a transfer of energy to or from the one of the at least two of the energy dissipation system, external energy charging system, or internal energy storage system with which the control system is selected for electrical communication is controlled by varying a ratio of a first time to a second time. The first time corresponds to when the first switching module is on, and the second time corresponds to when the first switching module is off.

In another aspect, the at least two of an energy dissipation system, external energy charging system, or internal energy storage system are selectably connected to the control system at a point interposed between the first and second switching modules.

In another aspect, the energy dissipation system includes a resistive load configured to dissipate energy from a dynamic braking activity. When the control system is selected for electrical communication with the energy dissipation system, a first path wherein the resistive load is connected to an energy source and dissipates energy is defined when the first switching module is on, and a second path wherein the resistive load is disconnected from the energy source and does not dissipate energy is defined when the first switching module is off.

In another aspect, the internal energy storage system includes a battery having a first battery bank and a second battery bank, and wherein the first and second switching modules control a transfer between the first battery bank and the second battery bank when the system is selected for electrical communication with the internal energy storage system.

In another aspect, the internal energy storage system includes a capacitor, and the first and second switching modules control a transfer between the capacitor and at least one of a battery and a direct current bus when the system is selected for electrical communication with the internal energy storage system.

In another aspect, the first and second switching modules control a transfer between the external energy charging system and at least one of a battery or a direct current bus disposed within the vehicle system when the system is selected for electrical communication with the external energy charging system.

In another aspect, the system includes a first switching system including the first switching module and the second switching module and a second switching system including a third switching module and a fourth switching module operably connected to the third switching module. The second switching system is configured to be selectably connected to the at least two of the energy dissipation system, external energy charging system, or internal energy storage system. The third switching module and the fourth switching module control the path of a current distributed through an additional one of the at least two of the energy dissipation system, external energy charging system, or internal energy storage system when the second switching system is selected for electrical communication with the additional one of the at least two of the energy dissipation system, external energy charging system, or internal energy storage system. When the first switching system controls one of the at least two of the energy dissipation system, external energy charging system, or internal energy storage system when the system is selected for electrical communication with the one of the at least two of the energy dissipation system, external energy charging system, or internal energy storage system, the second switching system is configured to contemporaneously control the additional one of the at least two of the energy dissipation system, external energy charging system, or internal energy storage system when the second switching system is selected for electrical communication with the additional one of the at least two of the energy dissipation system, external energy charging system, or internal energy storage system.

In another embodiment, a first switching control system includes a first switching module and a second switching module. The second switching module is operably connected to the first switching module. The system also includes a first energy dissipation system configured to dissipate energy associated with a vehicle system. The first switching control system is selectably connected to the first energy dissipation system. The first energy dissipation system includes a resistive load configured to dissipate energy from a dynamic braking activity. Also, the system includes a second switching control system that includes a third switching module and a fourth switching module, with the fourth switching module operably connected to and in electrical communication with the third switching module. The second switching control system is selectably connected to at least one of the energy dissipation system or a second energy dissipation system. Further, the first switching control system and the second switching control system are configured to be selectably connected to at least one of an external energy charging system or an internal energy storage system. When one of the first and second switching control systems is selected for electrical communication with one of the first energy dissipation system or the second energy dissipation system, the other of the first and second switching control systems is configured to be contemporaneously selectable for electrical communication with one of the at least one of an external energy charging system or internal energy storage system and to control the path of a current distributed through the one of the at least one of an external energy charging system or internal energy storage system when selected for electrical communication with one of the at least one of an external energy charging system or internal energy storage system.

In another aspect, the other of the first and second switching control systems is configured to be selectable for electrical communication with the other of the first energy dissipation system or the second energy dissipation system contemporaneously when the one of the first and second switching control systems is selected for electrical communication with the one of the first energy dissipation system or the second additional energy dissipation system.

In another aspect, the first energy dissipation system and the at least one of the external energy storage system or internal energy storage system are selectably connected to the first switching control system at a point interposed between the first and second switching modules and selectably connected to the second switching control system at a point interposed between the third and fourth switching modules.

In another aspect, the internal energy storage system includes a battery having a first battery bank and a second battery bank. The other of the first and second switching control systems controls a transfer between the first battery bank and the second battery bank when the other of the first and second switching control systems is selected for electrical communication with the internal energy storage system.

In another aspect, the internal energy storage system includes a capacitor. The other of the first and second switching systems controls a transfer between the capacitor and at least one of a battery and a direct current bus when the other of the first and second switching systems is selected for electrical communication with the internal energy storage system.

In another aspect, the other of the first and second switching systems controls a transfer between the external charging system and at least one of a battery or a direct current bus disposed within the vehicle system when the other of the first and second switching systems is selected for electrical communication with the external charging system.

In another aspect, when the first switching control system is selected for electrical communication with the first energy dissipation system, a first path wherein the resistive load is connected to an energy source and dissipates energy is defined by a first setting of the first switching control system, and a second path wherein the resistive load is disconnected from the energy source and does not dissipate energy is defined by a second setting of the first switching control system.

In another embodiment, a method (e.g. a method for controlling energy transfer in a vehicle system) includes controlling a path of current through a dynamic braking energy dissipation module of a vehicle system using a switching system that is selectably connected to the dynamic braking energy dissipation module and at least one of an external charging system or an internal energy storage system. The method also includes disengaging electrical communication between the switching system and the dynamic braking energy dissipation module. Further, the method includes establishing electrical communication between the switching system and one of the at least one of an external charging system or internal energy storage system. Also, the method includes controlling a path of current through the one of the at least one of an external charging system or internal energy storage system using the switching system.

In another aspect, the internal energy storage system includes a battery having a first battery bank and a second battery bank. Controlling a path of current through the one of the at least one of the external charging system or internal energy storage system includes controlling timing of first and second switching modules of the switching system to define a plurality of paths to control a transfer between the first battery bank and the second battery bank.

In another aspect, the internal energy storage system includes a capacitor, and controlling a path of current through the one of the at least one of the external charging system or internal energy storage system includes controlling timing of first and second switching modules of the switching system to define a plurality of paths to control a transfer between the capacitor and at least one of a battery and a direct current bus.

In another aspect, controlling a path of current through the one of the at least one of an external charging system or internal energy storage system includes controlling the timing of first and second switching modules of the switching system to define a plurality of paths to control a transfer between the external charging system and at least one of a battery or a direct current bus disposed within the vehicle system.

In another aspect, the method also includes using an additional switching system to control a path of current through one of the dynamic braking energy dissipation system or one of the at least one of the external charging system or internal energy storage system not being controlled by the switching system. The additional switching system is selectably connected to at least two of the dynamic braking energy dissipation module, an additional dynamic braking energy dissipation module, and the at least one of an external charging system and an internal storage system.

In another embodiment, a vehicle system includes an energy dissipation system, an internal energy storage system, an external energy charging system, and a control system. The energy dissipation system is disposed onboard a vehicle and configured to dissipate energy of a dynamic braking operation of the vehicle. The internal energy storage system is disposed onboard the vehicle and configured to store energy for use by the vehicle. The external energy charging system is disposed onboard the vehicle and configured to provide energy from a source external to the vehicle for storage by the internal energy storage system. The control system includes a first switching module onboard the vehicle and a second switching module onboard the vehicle that is operably connected with the first switching module. The control system is configured to be selectably connected to the energy dissipation system, the internal energy storage system, and the external energy charging system. When the control system is selected for electrical communication with one of the energy dissipation system, the external energy charging system, or the internal energy storage system, the first and second switching modules are operative to control the path of a current distributed through the one of the energy dissipation system, the external energy charging system, or the internal energy storage system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A control system comprising:
    a first switching module; and
    a second switching module operably connected to the first switching module, the first switching module and the second switching module arranged in series between positive and negative portions of a DC bus;
    wherein the control system is configured to be selectably connected, at a location interposed between the first switching module and the second switching module, to at least two of:
        an energy dissipation system, the energy dissipation system configured to dissipate energy associated with a vehicle system;
        an internal energy storage system, the internal energy storage system configured to store energy for use by the vehicle system; or
        an external energy charging system, the external energy charging system configured to provide energy from a source external to the vehicle system for storage by the internal energy storage system; and
    wherein, when the control system is selected for connection with one of the at least two of the energy dissipation system, external energy charging system, or internal energy storage system, the first and second switching modules control the path of a current distributed through the one of the at least two of the energy dissipation system, external energy charging system, or internal energy storage system, and wherein the control system is configured to be selected for connection with the one of the at least two of the energy dissipation system, external energy charging system, or internal energy storage system by placing the one of the at least two of the energy dissipation system, external energy charging system, or internal energy storage system in electrical communication with the location interposed between the first switching module and the second switching module.

2. The control system of claim 1, wherein a transfer of energy to or from the one of the at least two of the energy dissipation system, external energy charging system, or internal energy storage system with which the system is selected for connection is controlled by varying a ratio of a first time to a second time, the first time corresponding to when the first switching module is on, and the second time corresponding to when the first switching module is off.

3. The control system of claim 1, wherein the energy dissipation system comprises a resistive load configured to dissipate energy from a dynamic braking activity, wherein, when the system is selected for electrical communication with the energy dissipation system, a first path wherein the resistive load is connected to an energy source and dissipates energy is defined when the first switching module is on, and wherein a second path wherein the resistive load is disconnected from the energy source and does not dissipate energy is defined when the first switching module is off.

4. The control system of claim 1, wherein the internal energy storage system comprises a battery having a first battery bank and a second battery bank, and wherein the first and second switching modules control a transfer between the first battery bank and the second battery bank when the system is selected for connection with the internal energy storage system.

5. The control system of claim 1, wherein the internal energy storage system comprises a capacitor, and wherein the first and second switching modules control a transfer between the capacitor and at least one of a battery and a direct current bus when the system is selected for connection with the internal energy storage system.

6. The control system of claim 1, wherein the first and second switching modules control a transfer between the external energy charging system and at least one of a battery or a direct current bus disposed within the vehicle system when the system is selected for connection with the external energy charging system.

7. The control system of claim 1, comprising:
a first switching system comprising the first switching module and the second switching module; and
a second switching system comprising a third switching module and a fourth switching module operably connected to the third switching module;
wherein the second switching system is configured to be selectably connected to the at least two of the energy dissipation system, external energy charging system, or internal energy storage system;
wherein the third switching module and the fourth switching module control the path of a current distributed through an additional one of the at least two of the energy dissipation system, external energy charging system, or internal energy storage system when the second switching system is selected for connection with the additional one of the at least two of the energy dissipation system, external energy charging system, or internal energy storage system; and
wherein, when the first switching system controls one of the at least two of the energy dissipation system, external energy charging system, or internal energy storage system when the system is selected for connection with the one of the at least two of the energy dissipation system, external energy charging system, or internal energy storage system, the second switching system is configured to contemporaneously control the additional one of the at least two of the energy dissipation system, external energy charging system, or internal energy storage system when the second switching system is selected for connection with the additional one of the at least two of the energy dissipation system, external energy charging system, or internal energy storage system.

8. A system comprising:
a first switching control system comprising:
a first switching module; and
a second switching module operably connected to the first switching module, the first switching module and the second switching module arranged in series between positive and negative portions of a DC bus;
a first energy dissipation system configured to dissipate energy associated with a vehicle system, the first switching control system selectably connected to the first energy dissipation system at a location interposed between the first switching module and the second switching module, the first energy dissipation system comprising a resistive load configured to dissipate energy from a dynamic braking activity; and
a second switching control system comprising:
a third switching module; and
a fourth switching module operably connected to and in electrical communication with the third switching module, the third switching module and the fourth switching module arranged in series between the positive and negative portions of the DC bus;
wherein the second switching control system is selectably connected to at least one of the first energy dissipation system or a second energy dissipation system at a location interposed between the third switching module and the fourth switching module;
wherein the first switching control system and the second switching control system are configured to be selectably connected to at least one of:
an internal energy storage system, the internal energy storage system configured to store energy for use by the vehicle system; or
an external energy charging system, the external energy charging system configured to provide the energy to the internal energy storage system for storage by the internal energy storage system; and
wherein when one of the first and second switching control systems is selected for electrical communication with one of the first energy dissipation system or the second energy dissipation system, the other of the first and second switching control systems is configured to be contemporaneously selectable for electrical communication with one of the at least one of the external energy charging system or internal energy storage system and to control the path of a current distributed through the one of the at least one of the external energy charging system or internal energy storage system when selected for electrical communication with the one of the at least one of the external energy charging system or internal energy storage system.

9. The system of claim 8, wherein the other of the first and second switching control systems is configured to be selectable for electrical communication with the other of the first energy dissipation system or the second energy dissipation system contemporaneously when the one of the first and second switching control systems is selected for electrical communication with the one of the first energy dissipation system or the second energy dissipation system.

10. The system of claim 8, wherein the internal energy storage system comprises a battery having a first battery bank and a second battery bank, and wherein the other of the first and second switching control systems controls a transfer between the first battery bank and the second battery bank when the other of the first and second switching control systems is selected for electrical communication with the internal energy storage system.

11. The system of claim 8, wherein the internal energy storage system comprises a capacitor, and wherein the other of the first and second switching systems controls a transfer between the capacitor and at least one of a battery and a direct current bus when the other of the first and second switching systems is selected for electrical communication with the internal energy storage system.

12. The system of claim 8, wherein the other of the first and second switching systems controls a transfer between the external charging system and at least one of a battery or a direct current bus disposed within the vehicle system when the other of the first and second switching systems is selected for electrical communication with the external charging system.

13. The system of claim 8, wherein, when the first switching control system is selected for electrical communication with the first energy dissipation system, a first path wherein the resistive load is connected to an energy source and dissipates energy is defined by a first setting of the first switching control system and a second path wherein the resistive load is disconnected from the energy source and does not dissipate energy is defined by a second setting of the first switching control system.

14. A method comprising:
controlling a path of current through a dynamic braking energy dissipation module of a vehicle system using a switching system that is selectably connected to the dynamic braking energy dissipation module and at least one of an external charging system or an internal energy storage system, wherein the switching system comprises a first switching module and a second switching module, wherein the switching system is selectably connected to the dynamic braking energy dissipation module and at least one of an external charging system or an internal energy storage system at a location interposed between the first switching module and the second switching module;
disengaging electrical communication between the switching system and the dynamic braking energy dissipation module;
establishing electrical communication between the switching system and one of the at least one of the external charging system or internal energy storage system; and
controlling a path of current through the one of the at least one of the external charging system or internal energy storage system using the first switching module and the second switching module of the switching system.

15. The method of claim 14, wherein the internal energy storage system comprises a battery having a first battery bank and a second battery bank, and wherein controlling the path of current through the one of the at least one of the external charging system or internal energy storage system comprises controlling timing of first and second switching modules of the switching system to define a plurality of paths to control a transfer between the first battery bank and the second battery bank.

16. The method of claim 14, wherein the internal energy storage system comprises a capacitor, and wherein controlling a path of current through the one of the at least one of the external charging system or internal energy storage system comprises controlling timing of first and second switching modules of the switching system to define a plurality of paths to control a transfer between the capacitor and at least one of a battery and a direct current bus.

17. The method of claim 14, wherein controlling a path of current through the one of the at least one of an external charging system or internal energy storage system comprises controlling timing of first and second switching modules of the switching system to define a plurality of paths to control a transfer between the external charging system and at least one of a battery or a direct current bus disposed within the vehicle system.

18. The method of claim 14, further comprising:
using an additional switching system to control a path of current through one of the dynamic braking energy dissipation system or one of the at least one of the external charging system or internal energy storage system not being controlled by the switching system, the additional switching system being selectably connected to at least two of:
the dynamic braking energy dissipation module;
an additional dynamic braking energy dissipation module; or
the at least one of the external charging system or the internal energy storage system.

19. A vehicle system comprising:
an energy dissipation system onboard a vehicle, the energy dissipation system configured to dissipate energy of a dynamic braking operation of the vehicle;
an internal energy storage system onboard the vehicle, the internal energy storage system configured to store energy for use by the vehicle;
an external energy charging system onboard the vehicle, the external energy charging system configured to provide energy from a source external to the vehicle for storage by the internal energy storage system; and
a control system comprising a first switching module onboard the vehicle and a second switching module onboard the vehicle and operably connected with the first switching module, the first switching module and the second switching module arranged in series between positive and negative portions of a DC bus;
wherein the control system is configured to be selectably connected to the energy dissipation system, the internal energy storage system, and the external energy charging system at a location interposed between the first switching module and the second switching module; and
wherein, when the control system is selected for electrical communication with one of the energy dissipation system, the external energy charging system, or the internal energy storage system, the first and second switching modules are operative to control the path of a current distributed through the one of the energy dissipation system, the external energy charging system, or the internal energy storage system.

* * * * *